United States Patent
Untermeyer et al.

(10) Patent No.: US 6,851,387 B2
(45) Date of Patent: Feb. 8, 2005

(54) AQUACULTURE METHOD AND SYSTEM FOR PRODUCING AQUATIC SPECIES

(75) Inventors: Thomas C Untermeyer, Lakehills, TX (US); Bill G. Williams, Waco, TX (US); Gerald Easterling, Carrollton, TX (US)

(73) Assignee: Automated Shrimp Holding Corporation, San Antonio, TX (US)

( * ) Notice: Subject to any disclaimer, the term of this patent is extended or adjusted under 35 U.S.C. 154(b) by 0 days.

(21) Appl. No.: 10/604,750

(22) Filed: Aug. 14, 2003

(65) Prior Publication Data

US 2004/0107914 A1 Jun. 10, 2004

Related U.S. Application Data

(63) Continuation-in-part of application No. 09/683,798, filed on Feb. 15, 2002, now Pat. No. 6,615,767.

(51) Int. Cl.$^7$ .............................................. A01K 61/00
(52) U.S. Cl. ..................... 119/212; 119/207; 119/210; 119/213
(58) Field of Search ................................ 119/204, 205, 119/206, 207, 208, 209, 210, 211, 212, 213, 215, 200

(56) References Cited

U.S. PATENT DOCUMENTS

| | | | | |
|---|---|---|---|---|
| 3,998,186 A | * | 12/1976 | Hodges | ....................... 119/207 |
| 4,163,064 A | * | 7/1979 | Hill | ................................ 426/2 |
| 4,368,691 A | * | 1/1983 | Brune | ........................ 119/207 |
| 4,593,647 A | * | 6/1986 | Sorgeloos et al. | .......... 119/205 |
| 4,906,479 A | * | 3/1990 | Kitagawa et al. | .............. 426/1 |
| 5,104,668 A | * | 4/1992 | Cole et al. | .................. 426/285 |
| 5,158,788 A | * | 10/1992 | Lavens et al. | .................. 426/2 |
| 5,739,006 A | * | 4/1998 | Abe et al. | ..................... 435/67 |
| 6,103,225 A | | 8/2000 | Barclay | |
| 6,261,590 B1 | * | 7/2001 | Place et al. | ................. 424/442 |
| 6,443,097 B1 | | 9/2002 | Zohar et al. | |

* cited by examiner

*Primary Examiner*—Yvonne R. Abbott
(74) *Attorney, Agent, or Firm*—Taylor Russell & Russell, P.C.

(57) ABSTRACT

The invention provides a method and system for producing aquatic specie for consumer consumption within a closed aquaculture system. It provides for growing algae in artificial saltwater under controlled conditions in an algae subsystem, feeding the algae to adult artemia for producing small artemia in an artemia subsystem, feeding the algae and small artemia to immature aquatic specie for producing adolescent aquatic specie in an aquatic specie nursery subsystem, and feeding the algae and small artemia to the adolescent aquatic specie to for producing adult aquatic specie in an aquatic specie growout subsystem, which are then harvested. The invention also includes a data acquisition and control subsystem for automated control of the aquaculture system. A unique filtration subsystem accepts waste from the aquatic specie subsystem, pumps the waste through a series of filters, and returns the filtered saltwater to the algae subsystem, the artemia subsystem and the aquatic specie subsystem.

55 Claims, 12 Drawing Sheets

AQUACULTURE METHOD AND SYSTEM FOR PRODUCING AQUATIC SPECIES

CROSS REFERENCE TO RELATED APPLICATIONS

This application is a continuation-in-part of U.S. Nonprovisional patent application Ser. No. 09/683,798 filed on Feb. 15, 2002 which is now U.S. Pat. No. 6,615,767.

BACKGROUND OF INVENTION

The invention relates generally to the field of aquaculture and, more particularly, to a system and method for producing aquatic species for consumer consumption. Although the invention relates to a method and system for producing many aquatic specie, the preferred embodiments disclose a method and system for producing shrimp.

While seafood has always been a staple in the diets of many people in the United States and elsewhere, it wasn't until the 1980s that a significant increase in seafood consumption occurred. The consumption was largely the result of an increased awareness of the medical evidence that supported the health benefits and longevity accrued from a seafood diet. As a result, seafood distributors provided a greater abundance and selection of seafood products that further increased consumption. This increased domestic demand coupled with increased international demand by an expanding population led to more efficient methods for harvesting naturally occurring fish stocks from the oceans of the world. The increasingly efficient methods resulted in rapid depletion of these native fish stocks, requiring government intervention to impose restrictions on the size of the total harvest to preserve populations of certain native species. The smaller harvests resulted in increasing the price of seafood products, which helped stimulate the search for methods of growing fish stocks in a controlled artificial environment. The production of catfish in catfish farms is a dominant example of the growing, large-scale aquaculture industry. Other species produced by the aquaculture industry include crayfish, oysters, shrimp, Tilapia and Striped Bass.

The United States consumes about one billion of the approximately seven billion pounds of shrimp that are consumed annually by the world population. While seventy-five percent of this annual harvest is provided by ocean trawling, aquaculture in the form of shrimp farms provide the other twenty five percent. However, ocean trawling suffers from a limited season, a declining catch rate and environmental concerns. Shrimp farms may be categorized as open systems and closed systems.

Open system shrimp farms are generally open to the environment, such as open-air ponds constructed near oceans to contain and grow shrimp. These open shrimp farms suffer from vagaries of predators, the weather, diseases and environmental pollution. Saltwater from the ocean must be continually circulated through the ponds and back to the ocean to maintain adequate water chemistry for the shrimp to grow. The shrimp farmers must supply daily additions of dry food pellets to the shrimp as they grow.

Closed shrimp farms are generally self-contained aquaculture systems. While closed shrimp farms have greater control over the artificial environment contained therein, they have not been entirely satisfactory because of limited production rates, water filtration and treatment problems, and manufactured feed. Although some of these shortcomings can be overcome by increased capital expenditures, such as for water treatment facilities, the increased capital, labor and energy costs may be prohibitive.

It is desirable, therefore, to have a method and system for producing aquatic species, and particularly shrimp, that are not limited by a season, declining catch rate, environmental concerns, predators, weather, diseases, low production rates, water treatment problems, or manufactured feed. The system and method should not be limited to a specific location for access to a shipping facility or proximity to the ocean.

SUMMARY OF INVENTION

The present invention provides a closed aquaculture system and method for producing aquatic specie and other aquatic species that is not limited by the seasons of the year, is not limited by a declining catch rate, does not exhibit environmental concerns and is not affected by predators, weather, or diseases. The present invention provides high production rates, does not exhibit water treatment or manufactured feed problems, and is not limited to a specific location for access to a shipping facility or proximity to the ocean. Use of automation results in reduced labor costs and greater system density.

Unlike existing systems and methods, the present invention replicates a natural biological cycle by combining live algae, live artemia and live aquatic specie in a controlled environment. This combination of algae, artemia and aquatic specie stabilizes key system parameters. In addition, the system can achieve higher algae, artemia and aquatic specie density than existing systems by using automation to continually monitor and modify the saltwater environment.

An embodiment of the present invention is a method for producing adult aquatic specie in an aquaculture system comprising growing algae within an algae subsystem containing saltwater illuminated by a light source, flowing the algae from the algae subsystem into an artemia subsystem containing adult artemia, an aquatic specie nursery subsystem and an aquatic specie growout subsystem, all containing saltwater, consuming the algae by the adult artemia and producing small artemia by the adult artemia within the artemia subsystem, passing the small artemia from the artemia subsystem to the aquatic specie nursery subsystem and the aquatic specie growout subsystem, consuming the algae and the small artemia by immature aquatic specie contained within the aquatic specie nursery subsystem for producing adolescent aquatic specie, the adolescent aquatic specie being passed to the aquatic specie growout subsystem, consuming the algae and the small artemia by the adolescent aquatic specie contained within the aquatic specie growout subsystem for producing adult aquatic specie, and harvesting the adult aquatic specie. The method may further comprise filtering a waste outflow from the aquatic specie growout subsystem by a filtration subsystem for providing a saltwater return to the algae subsystem, the artemia subsystem, the aquatic specie nursery subsystem and the aquatic specie growout subsystem. The method may further comprise controlling the aquaculture system with a data acquisition and control subsystem. The method may further comprising replenishing saltwater lost in the aquaculture system due to evaporation and leakage.

The step of growing algae within an algae subsystem may further comprise seeding a selected strain of algae into one or more containers containing saltwater, illuminating the algae subsystem with a light source for proper algae growth, maintaining a temperature of the algae and saltwater by a heater means, measuring pH, algae density, temperature, light source output, dissolved oxygen and micronutrients, and controlling $CO_2$ inflow for pH control, saltwater replenishment inflow, light source output, saltwater return inflow from a filtration subsystem, and algae outflow to the artemia subsystem, the aquatic specie nursery subsystem and the aquatic specie growout subsystem. The selected strain of algae may be selected from the group consisting of *isochrysis galbana, nannochloropsis, dunaliella, skeletonema, thalassiosira, phaeodactylum, chaetoceros, cylindrotheca, tetraselmis*, and *spirulina*. The optimum saltwater return inflow value may be selected to maintain an algae density value within a range of from 100 thousand to 10 million cells per milliliter of the preferred strain of algae. The one or more containers may be selected from the group consisting of open containers and sealed containers.

The step of consuming algae by the adult artemia and producing small artemia by the adult artemia within the artemia subsystem may further comprise adding adult artemia to one or more containers containing saltwater, illuminating the artemia subsystem with a light source for proper algae growth, maintaining a temperature of the artemia, algae and saltwater by a heater means, measuring waste, algae density, artemia density, temperature, pH, ammonia, light source output and dissolved oxygen, and controlling oxygen inflow, saltwater return inflow from a filtration subsystem, light source output, saltwater replenishment inflow, algae inflow and artemia outflow to the aquatic specie subsystem. The controlling a saltwater return inflow value may maintain an artemia outflow value to the aquatic specie nursery subsystem and the aquatic specie growout subsystem to adequately remove waste from the artemia subsystem and provide sufficient artemia to the aquatic specie nursery subsystem and the aquatic specie growout subsystem for food. The method may further comprise preventing adult artemia from leaving the one or more containers of the artemia subsystem and allowing artemia waste and small artemia to pass from the one or more containers of the artemia subsystem to the aquatic specie nursery subsystem and the aquatic specie growout subsystem by filtering container outflow through a 400-micron screen. The one or more containers may be selected from the group consisting of open containers and sealed containers.

The step of consuming the algae and the small artemia by an immature aquatic specie contained within the aquatic specie nursery subsystem may further comprise placing the immature aquatic specie in one or more containers in the aquatic specie nursery subsystem for consuming algae and artemia for producing adolescent aquatic specie, illuminating the aquatic specie nursery subsystem with a light source for proper algae growth, maintaining a temperature of the immature aquatic specie, algae, artemia and saltwater by a heater means, measuring waste, algae density, artemia density, aquatic specie size, aquatic specie density, temperature, pH, ammonia, light source output, and dissolved oxygen, controlling oxygen inflow, saltwater return inflow from a filtration subsystem, light source output, saltwater replenishment inflow, artemia inflow from the artemia subsystem, algae inflow from the algae subsystem and waste outflow to the filtration subsystem, gradually increasing the saltwater level in the one or more containers for increasing a volume of the one or more containers as the immature aquatic specie increase from immature size to adolescent size, and enabling the adolescent aquatic specie to be passed through to the aquatic specie growout system. The step of controlling the waste outflow to the filtration subsystem may comprise filtering the waste outflow from the aquatic specie nursery subsystem through a filter screen to prevent immature aquatic specie from leaving the aquatic specie nursery subsystem and allowing waste products to pass to the filtration subsystem. The filter screen may comprise a 400 micron bottom section and a 800 micron top section for enabling disposal of increased waste products from increasing size aquatic specie as the effective volume of the aquatic subsystem is increased by adding increasing a saltwater level to accommodate the larger specie size. The controlling a saltwater return inflow value may maintain a waste outflow value to the filtration subsystem by controlling volume to adequately remove waste from the aquatic specie subsystem. The preferred aquatic specie may be selected from the group consisting of *litopenaeus vannamei, monodon, indicus, stylirostis, chinensis, japonicus*, and *merguiensis*. The optimum waste outflow rate from the aquatic specie nursery subsystem may be selected to remove waste products from an aquatic specie density of from 0.25 to 0.5 pounds per gallon of saltwater. The one or more containers may be selected from the group consisting of open containers and sealed containers.

The step of consuming the algae and the small artemia by the adolescent aquatic specie contained within the aquatic specie growout subsystem may further comprise containing the immature aquatic specie in one or more containers in the aquatic specie growout subsystem for consuming algae and artemia, illuminating the aquatic specie growout subsystem with a light source for proper algae growth, maintaining a temperature of the adolescent aquatic specie, algae, artemia and saltwater by a heater means, measuring waste, algae density, artemia density, aquatic specie size, aquatic specie density, temperature, pH, ammonia, light source output, and dissolved oxygen, controlling oxygen inflow, light source output, saltwater return inflow from a filtration subsystem, saltwater replenishment inflow, artemia inflow from the artemia subsystem, algae inflow from the algae subsystem and waste outflow to the filtration subsystem, and gradually increasing the saltwater level in the one or more containers for increasing a volume of the one or more containers as the adolescent aquatic specie increase from adolescent size to adult size. The step of controlling the waste outflow to the filtration subsystem may comprise filtering the waste outflow from the aquatic specie growout subsystem through a filter screen to prevent immature aquatic specie from leaving the aquatic specie growout subsystem and allowing waste products to pass to the filtration subsystem. The filter screen may comprise a 2000 micron bottom section and a 5000 micron top section for enabling disposal of increased waste products from increasing size aquatic specie as the effective volume of the aquatic subsystem is increased by adding increasing a saltwater level to accommodate the larger specie size. The controlling a saltwater return inflow value may maintain a waste outflow value to the filtration subsystem by controlling volume to adequately remove waste from the aquatic specie growout subsystem. The optimum waste outflow rate from the aquatic specie growout subsystem may be selected to remove waste products from an aquatic specie density of from 0.25 to 0.5 pounds per gallon of saltwater. The one or more containers may be selected from the group consisting of open containers and sealed containers.

The step of filtering a waste outflow from the aquatic specie growout subsystem may comprise pumping the waste outflow from the aquatic specie growout subsystem to an input of a first mechanical filter, flowing a first part of an outflow from the first mechanical filter to an inflow of a biofilter, an outflow of the biofilter being connected to a saltwater return inflow of the aquatic specie nursery subsystem and a saltwater return inflow of the aquatic specie growout subsystem, flowing a second part of the outflow from the first mechanical filter to an inflow of a second mechanical filter, an outflow of the second mechanical filter being flowed through an inflow heating passage of a heat exchanger to a pasteurization chamber inflow, pasteurizing the pasteurization chamber inflow from the heat exchanger for destroying living organisms in the inflow and flowing a pasteurization chamber outflow to an outflow cooling passage of the heat exchanger, and flowing a pasteurized and cooled outflow from the heat exchanger outflow cooling passage to a saltwater return inflow of the algae subsystem and a saltwater return inflow of the artemia subsystem. The method may further comprise adding supplemental nutrients to the pasteurization chamber outflow under control of a data acquisition and control subsystem. The method may further comprise sterilizing the flow conduits from the heat exchanger cooling passage to the saltwater return inflow of the algae subsystem and the saltwater return inflow of the artemia subsystem using a steam sterilizer under control of a data acquisition and control subsystem.

The step of controlling the aquaculture system may comprise connecting measurements from the algae subsystem, artemia subsystem, the aquatic specie nursery subsystem and the aquatic specie growout subsystem to an input multiplexer, connecting an output from the input multiplexer to an input of a microprocessor, connecting an output of the microprocessor to a controller output, connecting an output from the output controller to controls for the algae subsystem, the artemia subsystem, the aquatic specie nursery subsystem, the aquatic specie growout subsystem and the filtration subsystem, and connecting the microprocessor to a video monitor and keyboard for providing a user interface. The aquaculture system may comprise a closed recirculating system. The harvested adult aquatic specie may be shrimp. The method may further comprise positioning habitat structures within the aquatic specie nursery subsystem and the aquatic specie growout subsystem for increasing the number of aquatic specie in the subsystem by providing a greater habitat surface area. The method may further comprise maintaining a temperature value in the algae subsystem, the artemia subsystem, the aquatic specie nursery subsystem and the aquatic specie growout subsystem within a range of from 23° C. to 32° C., maintaining a salinity value in the algae subsystem, the artemia subsystem, term, the aquatic specie nursery subsystem and the aquatic specie growout subsystem within a range of from 20 to 45 parts per thousand, maintaining a dissolved oxygen value in the artemia subsystem, the aquatic specie nursery subsystem and the aquatic specie growout subsystem within a range of from 4.5 to 9.0 parts per million, maintaining a pH value in the algae subsystem, the artemia subsystem, the aquatic specie nursery subsystem and the aquatic specie growout subsystem within a range of from 7.5 to 8.5, and adjusting an illumination level of light sources for the algae subsystem, the artemia subsystem, the aquatic specie nursery subsystem and the aquatic specie growout subsystem for regulating algae growth rates. The step of passing the small artemia may further comprise passing the small artemia and adult artemia from the artemia subsystem to the aquatic specie nursery subsystem and the aquatic specie growout subsystem.

Another embodiment of the present invention is a method for producing adult aquatic specie in an aquaculture system, comprising growing algae in saltwater, feeding the algae to artemia in saltwater, producing artemia by the artemia in saltwater, feeding the algae and the artemia to an immature aquatic specie in saltwater to produce adult aquatic specie, and harvesting the adult aquatic specie from the saltwater when mature. The step of growing algae may comprise illuminating the algae in the saltwater by a light source, controlling a temperature of the algae in the saltwater by a heat source, regulating a $CO_2$ inflow to control pH of the saltwater, replenishing saltwater lost due to evaporation and leakage, regulating a saltwater return inflow for controlling algae outflow, and measuring pH, algae density, temperature, light source output, dissolved oxygen and micronutrients. The step of feeding the algae to artemia in saltwater may comprise providing an inflow of algae and saltwater into the artemia in saltwater, illuminating the algae in the saltwater by a light source, controlling a temperature of the algae and artemia in saltwater by a heat source, regulating a $CO_2$ inflow to control pH of the saltwater, regulating an oxygen inflow to control dissolved oxygen, regulating a saltwater return inflow for controlling artemia, algae, waste and saltwater outflow, and measuring pH, algae density, temperature, light source output, ammonia, dissolved oxygen, waste, and artemia density. The step of producing artemia by the artemia in saltwater may comprise consuming algae by the adult artemia to generate small artemia, filtering the algae, adult artemia, small artemia, waste and saltwater through a screen that allows the algae, small artemia, waste and saltwater to pass as an outflow while restraining the adult artemia. The step of feeding the algae and the artemia to an immature aquatic specie in saltwater to produce adult aquatic specie may comprise providing an inflow of algae, artemia, waste and saltwater to the immature aquatic specie in saltwater, illuminating the algae in the saltwater by a light source, controlling a temperature of the algae, artemia, waste and saltwater by a heat source, regulating a $CO_2$ inflow to control pH of the saltwater, regulating an oxygen inflow to control dissolved oxygen, regulating a saltwater return inflow for controlling artemia, algae, waste and saltwater outflow, measuring aquatic specie density, aquatic specie size, pH, algae density, temperature, light source output, ammonia, dissolved oxygen, waste, volume and artemia density, consuming artemia by the immature aquatic specie to produce adolescent aquatic specie, consuming artemia by the adolescent aquatic specie to produce adult aquatic specie, and filtering the algae, aquatic specie, artemia, waste and saltwater through a graded screen that allows the algae, small artemia, waste and saltwater to pass as an outflow to a filtration means while restraining the aquatic specie. The method may further comprise positioning habitat structures for increasing the number of aquatic specie in the subsystem.

Yet another embodiment of the present invention is an aquaculture system for producing adult aquatic specie that comprises an algae subsystem containing saltwater illuminated by a light source for growing algae, means for flowing the algae from the algae subsystem into an artemia subsystem, an aquatic specie nursery subsystem and an aquatic specie growout subsystem, both containing saltwater, the artemia subsystem containing adult artemia for consuming the algae and producing small artemia, means for passing the small artemia from the artemia subsystem to the aquatic specie nursery subsystem containing an immature aquatic specie for consuming the algae and the small artemia and producing an adolescent aquatic specie, means for passing the adolescent aquatic specie from the aquatic specie nursery subsystem to the aquatic specie growout subsystem for consuming the algae and the small artemia and producing an adult aquatic specie, and means for harvesting the adult aquatic specie. The system may further comprise a filtration subsystem for filtering a waste outflow from the aquatic specie growout subsystem and for providing a saltwater return to the algae subsystem, the artemia subsystem, the aquatic specie nursery subsystem and the aquatic specie growout subsystem. The system may further comprise a data acquisition and control subsystem for controlling the aquaculture system. The system may further comprise means for replenishing saltwater lost in the aquaculture system due to evaporation and leakage. The algae subsystem containing saltwater illuminated by a light source for growing algae may further comprise a light source for illuminating the algae in the saltwater, a heater for controlling a temperature of the algae subsystem, a CO2 inflow for controlling pH of the algae subsystem, a saltwater replenishment inflow for replacing saltwater lost to evaporation and leakage, a saltwater return inflow from a filtration subsystem, an algae outflow to the artemia subsystem, and measurement means for measuring pH, algae density, temperature, light source output, dissolved oxygen, and micronutrients of the algae subsystem. The artemia subsystem containing adult artemia for consuming the algae and producing small artemia may further comprise a light source for illuminating the algae in the saltwater, a heater for controlling temperature of the artemia subsystem, a CO2 inflow for controlling pH of the algae subsystem, an oxygen inflow for controlling dissolved oxygen of the artemia subsystem, a saltwater replenishment inflow for replacing saltwater lost to evaporation and leakage, a saltwater return inflow from a filtration subsystem, a filter screen for separating the small artemia and waste from the adult artemia, an artemia outflow to the aquatic specie nursery subsystem, and measurement means for measuring pH, algae density, temperature, light source output, ammonia, dissolved oxygen, waste, and artemia density of the algae subsystem. The aquatic specie nursery subsystem containing an immature aquatic specie for consuming the algae and the small artemia and producing an adolescent aquatic specie may further comprise a light source for illuminating the algae in the saltwater, a heater for controlling temperature of the aquatic specie nursery subsystem, a CO2 inflow for controlling pH of the aquatic specie nursery subsystem, an oxygen inflow for controlling dissolved oxygen of the aquatic specie nursery subsystem, a saltwater replenishment inflow for replacing saltwater lost to evaporation and leakage, a saltwater return inflow from a filtration su system, a graded filter screen for separating the immature aquatic specie from the waste algae and small artemia, a waste outflow to the filtration subsystem, and measurement means for measuring aquatic specie density, aquatic specie size, pH, algae density, light source output, temperature, ammonia, dissolved oxygen, waste, and volume of the algae subsystem. The graded filter screen may be selected from the group consisting of a planar filter screen and a cylindrical filter screen. The aquatic specie growout subsystem containing an adolescent aquatic specie for consuming the algae and the small artemia; and producing an adult aquatic specie may further comprise a light source for illuminating the algae in the saltwater, a heater for controlling temperature of the aquatic specie growout subsystem, a CO2 inflow for controlling pH of the aquatic specie growout subsystem, an oxygen inflow for controlling dissolved oxygen of the aquatic specie growout subsystem, a saltwater replenishment inflow for replacing saltwater lost to evaporation and leakage, a saltwater return inflow from a filtration subsystem, a graded filter screen for separating the adolescent and adult aquatic specie from the waste algae and small artemia, a waste outflow to the filtration subsystem; and measurement means for measuring aquatic specie density, aquatic specie size, pH, algae density, light source output, temperature, ammonia, dissolved oxygen, waste, and volume of the algae subsystem. The graded filter screen may be selected from the group consisting of a planar filter screen and a cylindrical filter screen. The filtration subsystem may comprise a waste inflow from the aquatic specie growout subsystem connected to an inlet of a pump, an outlet of the pump connected to an inflow of a first mechanical filter, an outflow of the first mechanical filter connected to an inflow of a biofilter and an inflow of a second mechanical filter, an outflow of the biofilter connected to saltwater return inflows of the aquatic specie nursery subsystem and the aquatic specie growout subsystem, an outflow of the second mechanical filter connected through an inflow heating passage of a heat exchanger to a pasteurization chamber inflow, the pasteurization chamber pasteurizing the pasteurization chamber inflow from the heat exchanger for destroying living organisms in the inflow, an outflow from the pasteurization chamber connected through an outflow cooling passage of the heat exchanger, and the pasteurized and cooled outflow from the heat exchanger outflow cooling passage being sent to a saltwater return inflow of the algae subsystem and a saltwater return inflow of the artemia subsystem. The data acquisition and control subsystem for controlling the aquaculture system may comprise an input multiplexer for accepting measurement inputs from the algae subsystem, the artemia subsystem, the aquatic specie nursery subsystem and the aquatic specie growout subsystem, a microprocessor connected to an output of the input multiplexer, a monitor and keyboard user interface, and an input to an output controller, and control outputs of the output controller connected to the algae subsystem, the artemia subsystem, the aquatic specie nursery subsystem, the aquatic specie growout subsystem, and the filtration subsystem. The measurement inputs may comprise pH, algae density, temperature, light source output, dissolved oxygen and micronutrients from the algae subsystem, pH, algae density, temperature, light source output, ammonia, dissolved oxygen, waste, and artemia density from the artemia subsystem, aquatic specie density, aquatic specie size, pH, algae density, temperature, ammonia, dissolved oxygen, waste, volume, and artemia density from the aquatic specie nursery subsystem, and aquatic specie density, aquatic specie size, pH, algae density, temperature, ammonia, dissolved oxygen, waste, volume, and artemia density from the aquatic specie growout subsystem. The control outputs may comprise heater control, CO2 inflow, saltwater replenishment inflow, light source control, algae outflow, saltwater return inflow, and algae tank flow valves to the algae subsystem, heater control, oxygen inflow, artemia outflow, light source control, saltwater return inflow, algae inflow, and saltwater replenishment inflow to the artemia subsystem, heater control, oxygen inflow, waste outflow, light source control, saltwater return inflow, artemia inflow, and saltwater return inflow to the aquatic specie nursery subsystem, heater control, oxygen inflow, waste outflow, light source control, saltwater return inflow, artemia inflow, and saltwater return inflow to the aquatic specie growout subsystem, and pump speed control to the filtration subsystem. The system may further comprise habitat structures positioned within the aquatic specie subsystem for harvesting increased adult aquatic specie.

BRIEF DESCRIPTION OF DRAWINGS

These and other features, aspects and advantages of the present invention will become better understood with regard to the following description, appended claims, and accompanying drawings wherein:

DETAILED DESCRIPTION

Figure 1:
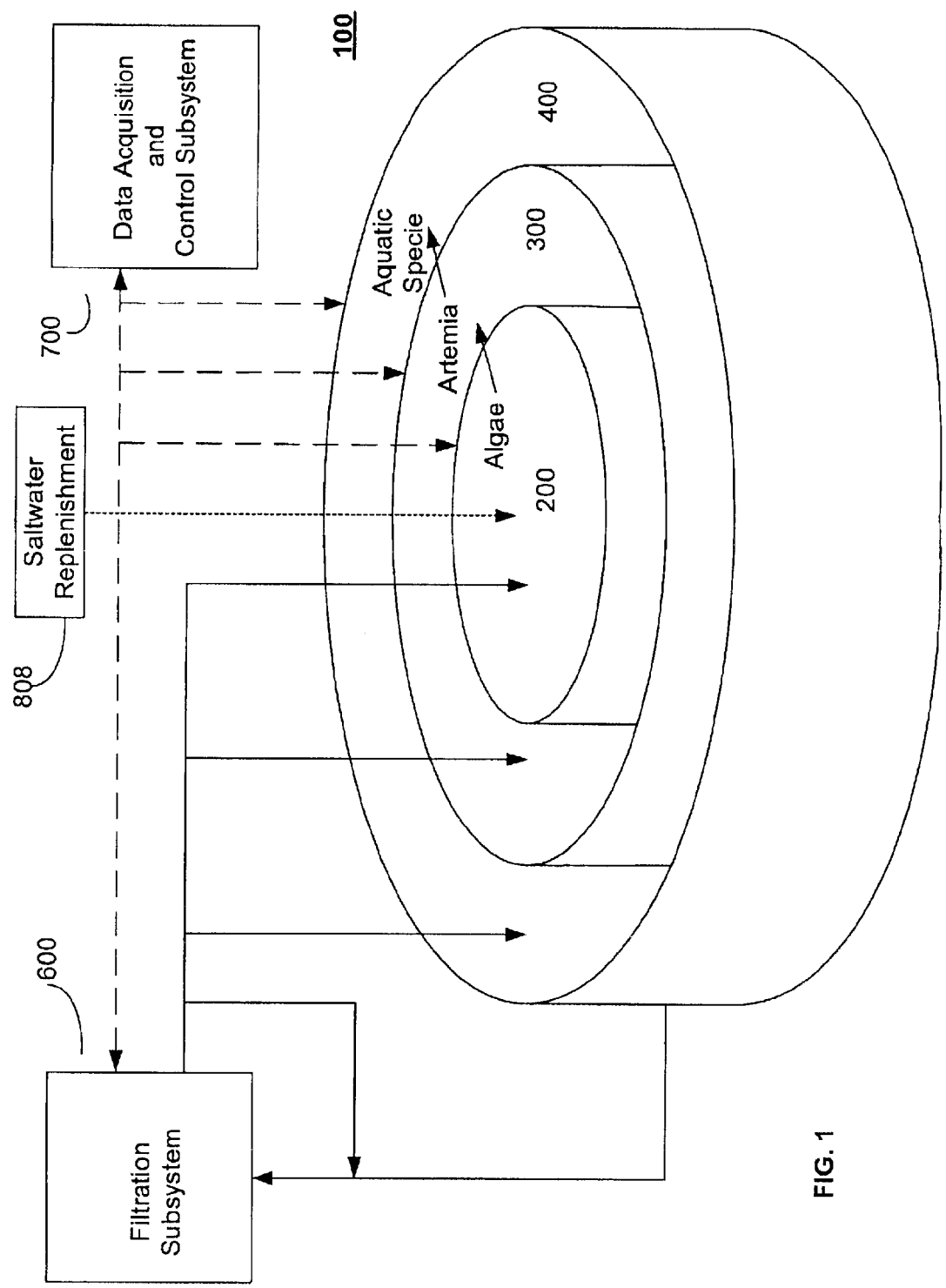
FIG. 1 shows a concentric aquaculture system according to the present invention.

Turning now to FIG. 1, FIG. 1 shows a concentric aquaculture system 100 according to the present invention. The concentric system 100 comprises an algae subsystem 200, an artemia subsystem 300, an aquatic specie subsystem 400, a filtration subsystem 600, a data acquisition and control subsystem 700, and a saltwater replenishment source 808. The algae subsystem 200, artemia subsystem 300, and aquatic specie subsystem 400 may comprise either open or sealed containers. Algae are grown in the algae subsystem 200, and flow to the artemia subsystem 300 and the aquatic specie subsystem 400. Adult artemia in the artemia subsystem 300 feed on the algae and produce small artemia (live *nauplii*), which flow to the aquatic species subsystem 400. The aquatic specie to be produced by the system 100 is introduced into the aquatic specie subsystem 400 at an immature stage, to be raised to an adult stage for harvesting. These immature species are contained in aquatic specie subsystem 400 and feed on the algae and artemia in the aquatic specie subsystem 400. Although the algae reduces the affect of waste products from the artemia and aquatic specie, the system 100 utilizes a unique filtration subsystem 600 that removes additional waste from the system during growth of the aquatic specie being produced. The data acquisition and control subsystem 700 is critical for maintaining a suitable environment for the algae, artemia, and aquatic specie being produced by automatically monitoring and regulating a number of critical environmental parameters. A source for saltwater replenishment 808 is provided to the algae subsystem 200 for replacing saltwater lost from evaporation and leakage. As noted above, although the method and system of the present invention may be used to produce a variety of aquatic species, the preferred embodiments disclose the production of shrimp.

Figure 2:
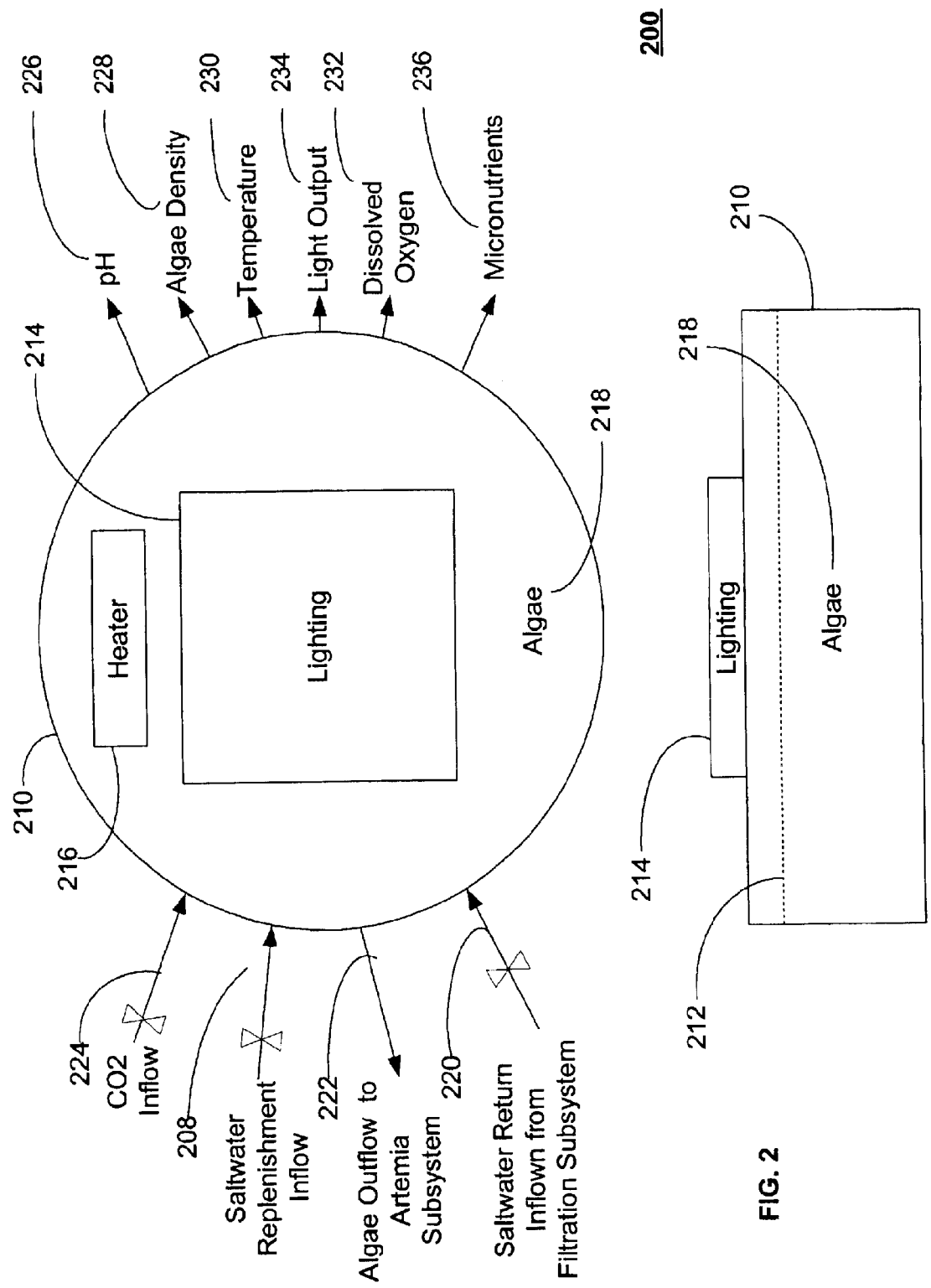
FIG. 2 shows an algae subsystem for use in a concentric aquaculture system.

Turning now to FIG. 2, FIG. 2 shows an algae subsystem 200 for use in a concentric aquaculture system 100. The algae subsystem 200 uses an enclosed tank 210, preferably of fiberglass construction, that contains saltwater and algae 218. The tank 210 may be either open or sealed. The saltwater has a salinity of from 30 to 35 parts per thousand. Lighting 214 provides energy for proper algae growth and a heater 216 maintains a temperature of the saltwater and algae 218 within an acceptable range. Sensors within the tank 210 connected to the data acquisition and monitoring subsystem 700 provide continuous monitoring of pH 226, algae density 228, temperature 230, light output 234, micronutrients 236 and dissolved oxygen 232. Since algae growth naturally causes the pH of the algae subsystem 200 to increase, controlled amounts of carbon dioxide gas (CO2) 224 is introduced into the system to maintain the pH 226 within acceptable levels. The algae will gravity feed 222 from the algae subsystem 200 to the artemia subsystem 300, depending on a saltwater return rate 220 from the filtration subsystem 600 for controlling the saltwater level 212 in the tank 210. Saltwater replenishment 208 having a salinity of from 30 to 35 parts per thousand is provided to replace saltwater losses, such as evaporation and leakage. An optimal saltwater return rate 220 will keep the algae density 228 between approximately 100 thousand to 10 million cells per milliliter for the preferred strain of algae (tajitian strain of *isochrysis galbana*).

Figure 3:
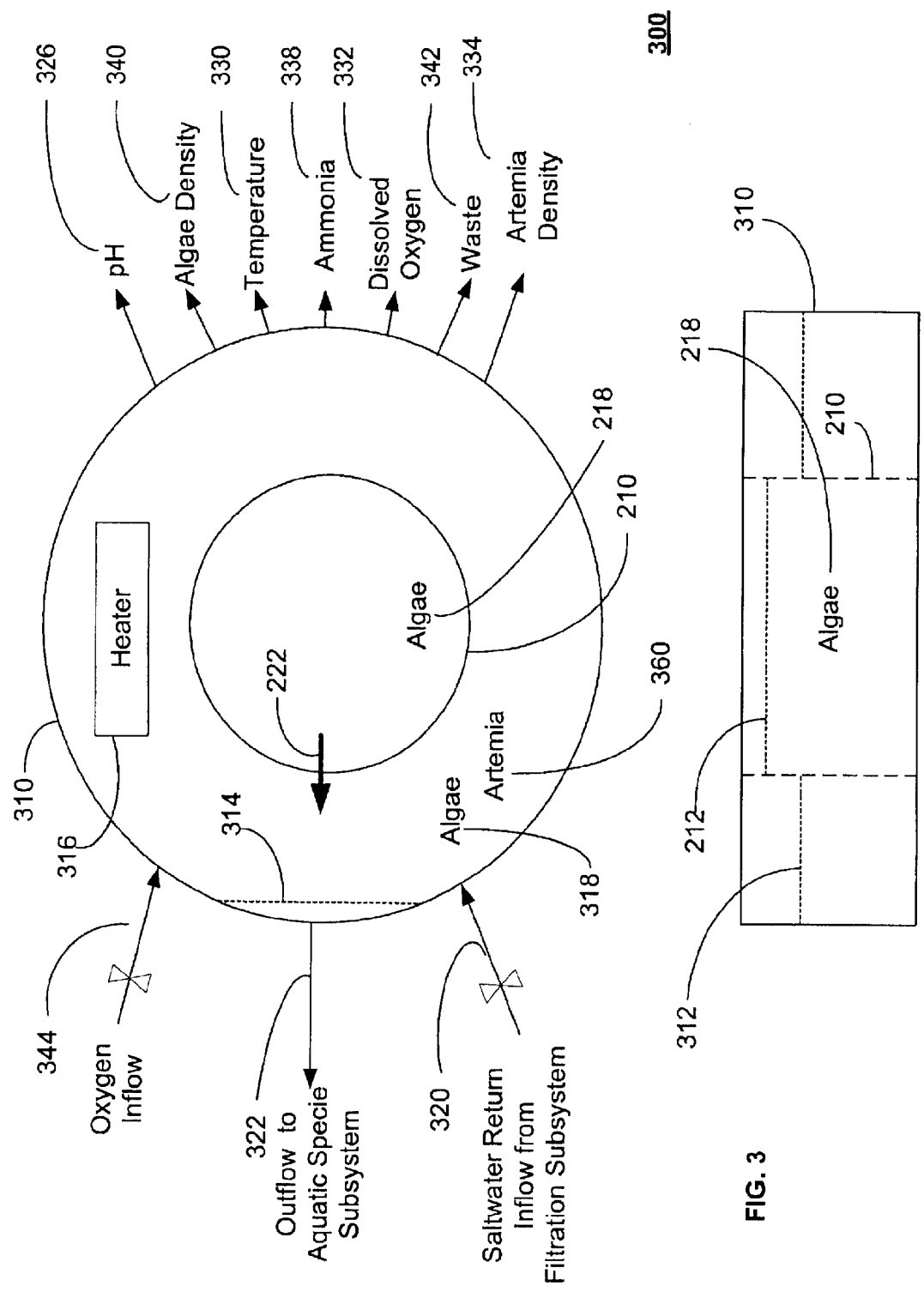
FIG. 3 shows an artemia subsystem for use in a concentric aquaculture system.

Turning now to FIG. 3, FIG. 3 shows an artemia subsystem 300 for use in a concentric aquaculture system 100. The artemia subsystem 300 utilizes an enclosed round tank 310, preferably of fiberglass construction, which contains the algae subsystem 200, saltwater and artemia 360. The tank 310 may be either open or sealed. Sensors continuously monitor artemia density 334, temperature 330, pH 326, ammonia 338, algae density 340, waste 342 and dissolved oxygen 332 within the artemia subsystem 300. Overlapping lighting from the algae subsystem 200 allows continued growth of the algae 318 fed to the artemia 360 in the artemia subsystem 300. Although waste from the artemia 360 causes the pH of the artemia subsystem 300 to decrease, the presence of the algae 318 will increase the pH, thereby stabilizing the pH of the artemia subsystem 300. The algae 318 also serve as food for the artemia 360. A heater 316 controlled by the data acquisition and control subsystem 700 maintains the temperature of the artemia subsystem 300 within an acceptable range. The adult artemia 360 produce small artemia on a continuous basis. A 400-micron screen 314 prevents the adult artemia 360 from leaving the artemia subsystem 300, but allows the artemia waste and small artemia to pass from the artemia subsystem 300 to the aquatic specie subsystem 400 by gravity feed. The flow rate to the aquatic specie subsystem 322 will depend on the return flow rate 320 from the filtration subsystem 600 and the flow rate 222 from the algae subsystem 200. An optimal flow rate 322 to the aquatic specie subsystem 400 adequately removes waste from the artemia subsystem 300 and also provides sufficient artemia 360 to the aquatic specie subsystem 400 for food. A flow of oxygen 344 is introduced into the artemia subsystem 300 for controlling the level of dissolved oxygen. The saltwater level 312 in the artemia subsystem 300 is determined by the return flow rate 320 from the filtration subsystem 600 and the algae subsystem 220. The preferred artemia species 360 originate from the Great Salt Lake in Utah, USA.

Figure 4:
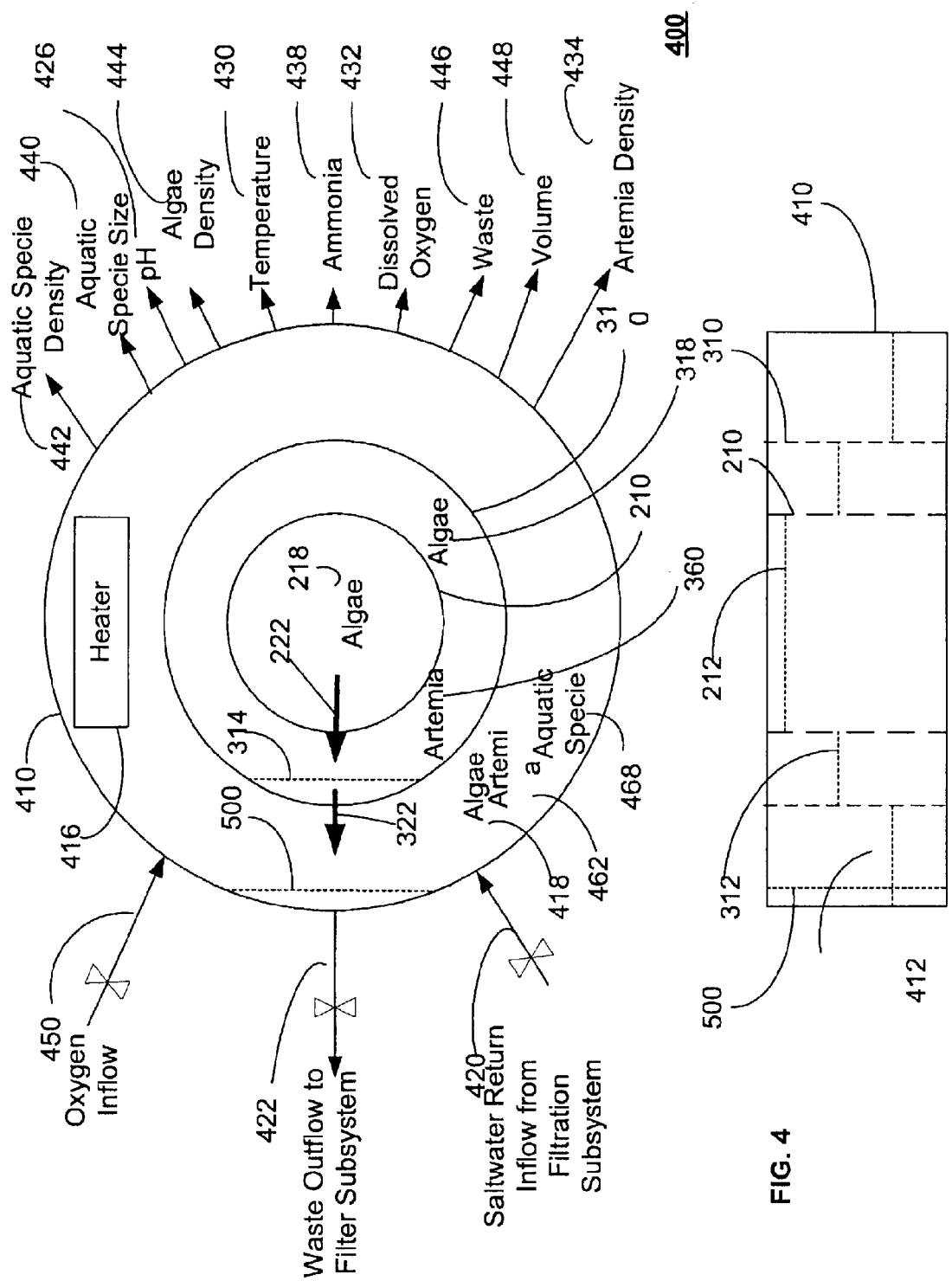
FIG. 4 shows an aquatic specie subsystem for use in a concentric aquaculture system.

Turning now to FIG. 4, FIG. 4 shows an aquatic specie subsystem 400 for use in a concentric aquaculture system 100. The aquatic specie subsystem 400 utilizes an enclosed round tank 410, preferably of fiberglass construction, which contains the algae subsystem 200 and the artemia subsystem 300 within it. The tank 410 may be either open or sealed. The aquatic specie subsystem 400 also contains aquatic specie 468, preferably shrimp, algae 418, saltwater, and artemia 462. Sensors continuously monitor artemia density 434, aquatic specie size 440, aquatic specie density 442, temperature 430, pH 426, dissolved oxygen 432, algae density 444, waste 446, volume 448 and ammonia 438. Habitat structures 414 are positioned in the aquatic species subsystem 400 for providing a greater habitat surface area for increasing the amount of aquatic species within the subsystem. The artemia 462 are food for the aquatic specie 468. A heater 416 maintains the temperature of the aquatic specie subsystem 400 within an acceptable range. A graded screen 500, preferably nylon material, provides filtration of aquatic specie waste products and allows waste flow 422 to the filter subsystem 600. The aquatic specie subsystem 400 is initially stocked with live, commercially available post-larvae shrimp in salt water maintained at a low level. As the shrimp grow from about 0.5 inches in length to about 5 inches in length, the system 100 automatically adds saltwater to the aquatic specie subsystem 400 to gradually increase the saltwater level 412 and effective volume of the aquatic specie subsystem 400. As the saltwater level 412 of the aquatic subsystem 400 increases and the shrimp 468 grow in size, larger screen openings of the graded screen 500 allow passage of larger waste particles while preventing the shrimp 468 from passing through the graded screen. The method of slowly increasing the level of the saltwater 412 and the effective volume of the aquatic specie subsystem 400 has an additional beneficial feature. When the shrimp 468 are small, the effective volume of the aquatic specie subsystem 400 is also small, allowing a higher and more beneficial concentration of food. As the shrimp grow larger, the increase in effective volume maintains an optimum food density and optimum shrimp separation. Waste products pass through the graded screen 500 and on to the filter subsystem 700. Since the aquaculture system 100 is a closed system, the flow rate 422 to the filtration subsystem 600 will depend on the return flow rate 420 from the filtration subsystem 600 and the flow rate 322 from the artemia subsystem 300. An optimum flow rate will adequately remove waste products from the aquatic specie subsystem 400 at a density of 0.25 to 0.5 pounds of shrimp per gallon of saltwater. The preferred shrimp species is *Litopenaeus Vannamei* (Pacific White Shrimp).

Figure 5B:
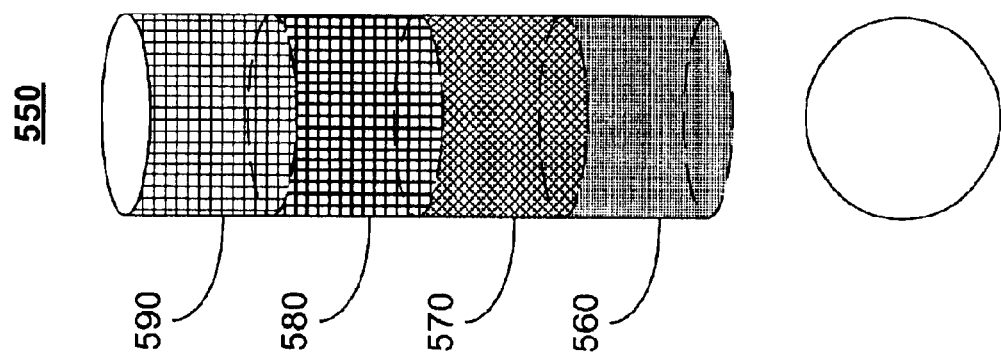
FIG. 5A and FIG. 5B show graded filter screens for use in an aquatic specie subsystem of aquaculture systems.
Figure 5A:
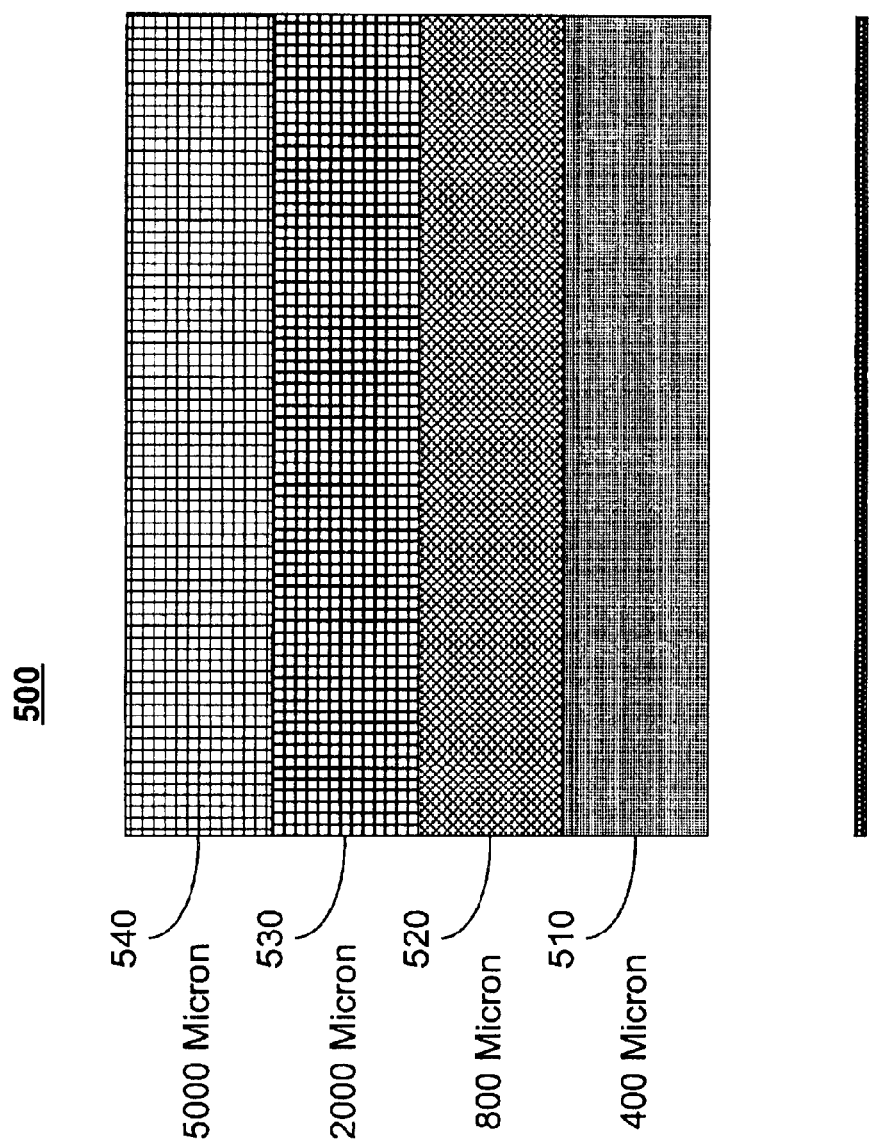

Turning now to FIG. 5A, FIG. 5A shows a planar graded filter screen 500 for use in an aquatic specie subsystem 400 of a concentric aquaculture system 100. FIG. 5A depicts one embodiment of a graded screen 500 having four distinct screens, each having a distinct mesh size. In alternative embodiments of the graded filter screen 500, there may also be a multitude of distinct screen mesh sizes, or a continuous gradient of mesh sizes. The lowest of the four distinct screens 510 comprises a screen having a mesh size of about 400 microns. The height of the lower screen 510 corresponds to a saltwater level 412 for aquatic specie inhabiting the aquatic specie subsystem 400 for between 0 and 2 weeks. The second screen 520 comprises a screen having a mesh size of about 800 microns. The height of the second screen 520 corresponds to a saltwater level 412 for aquatic specie inhabiting the aquatic specie subsystem 400 for between 2 and 4 weeks. The third screen 530 comprises a screen having a mesh size of about 2000 microns. The height of the third screen 530 corresponds to a saltwater level 412 for aquatic specie inhabiting the aquatic specie subsystem 400 for between 5 and 8 weeks. The fourth or top screen 540 comprises a screen having a mesh size of about 5000 microns. The height of the top screen 540 corresponds to a saltwater level 412 for aquatic specie inhabiting the aquatic specie subsystem 400 for between 9 and 13 weeks.

Turning now to FIG. 5B, FIG. 5B shows a cylindrical graded filter screen 550 for use in an aquatic specie subsystem 500 of a distributed aquaculture system 800. FIG. 5B depicts one embodiment of a graded screen 550 having four distinct screens, each having a distinct mesh size. In alternative embodiments of the graded filter screen 550, there may also be a multitude of distinct screen mesh sizes, or a continuous gradient of mesh sizes. The lowest of the four distinct screens 560 comprises a screen having a mesh size of about 400 microns. The height of the lower screen 560 corresponds to a saltwater level in the aquatic specie subsystem 1100 for aquatic specie inhabiting the aquatic specie subsystem 1100 for between 0 and 2 weeks. The second screen 570 comprises a screen having a mesh size of about 800 microns. The height of the second screen 570 corresponds to a saltwater level for aquatic specie inhabiting the aquatic specie subsystem 1100 for between 2 and 4 weeks. The third screen 580 comprises a screen having a mesh size of about 2000 microns. The height of the third screen 580 corresponds to a saltwater level for aquatic specie inhabiting the aquatic specie subsystem 1100 for between 5 and 8 weeks. The fourth or top screen 590 comprises a screen having a mesh size of about 5000 microns. The height of the top screen 590 corresponds to a saltwater level for aquatic specie inhabiting the aquatic specie subsystem 1100 for between 9 and 13 weeks.

Figure 6:
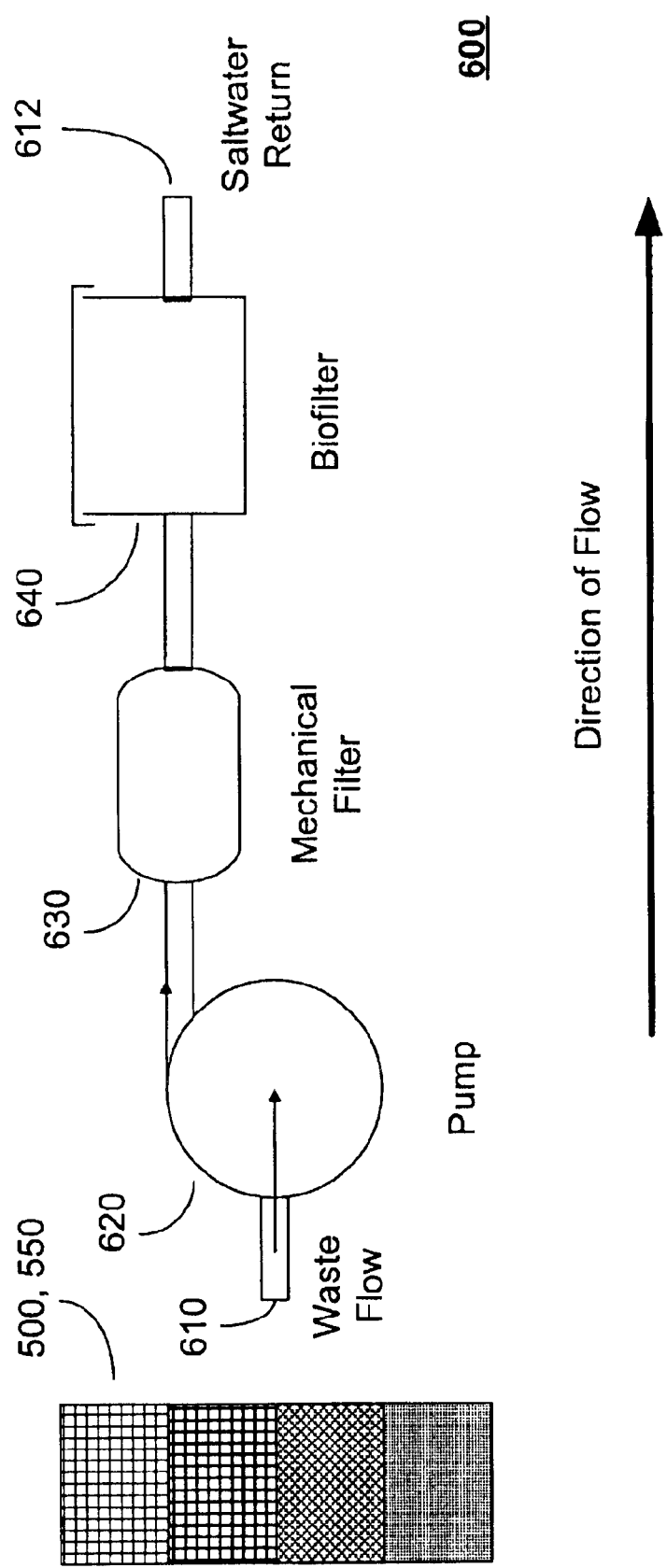
FIG. 6 shows a filtration subsystem for use in aquaculture systems.

Turning now to FIG. 6, FIG. 6 shows a filtration subsystem 600 for use in an aquaculture system 100. The input flow 610 to the filtration subsystem 600 is depicted in FIG. 1 and the output flow 612 to the algae subsystem 200, the artemia subsystem 300 and the aquatic specie subsystem 400 is explained with regard to FIG. 2–FIG. 4. The input flow 610 to the filtration system 600 is connected to the waste flow 422 from the aquatic specie subsystem 400 after passing through the graded filter screen 500. The output flow 612 from the filtration subsystem 600 is connected to the saltwater return 220 of the algae subsystem 200, the saltwater return 320 of the artemia subsystem 300 and the saltwater return 420 of the aquatic specie subsystem 400. As noted above, waste enters the input flow 610 filtration subsystem 600 from the aquatic specie subsystem 400 after passing through the graded filter screen 500. Although the algae in the system 100 will remove micronutrients from the system created by the aquatic specie waste products, additional filtration allow for higher aquatic specie densities. A saltwater pump 620 pumps the waste product stream 610, which has passed through the graded filter screen 500, through a mechanical filter 630 to remove particulate material. The mechanical filter 630 has a preferred filter size of about 100 microns, thereby trapping particulate material having a size greater than 100 microns. The waste stream is then passed through a biofilter 640 to convert ammonia into nitrates for use as a nutrient for the algae. After filtration of the waste stream, a plumbing and valve network returns the filtered and cleansed saltwater to the algae subsystem 200, the artemia subsystem 300, the aquatic specie subsystem 400 and the filtration subsystem 600. The return flow rates to each of these subsystems, which is controlled by the data acquisition and control subsystem 700 and respective return valves, determines the flow rate through each subsystem. The data acquisition and control subsystem 700 will vary the return flow rate 220 of the algae subsystem 200 to maintain a specific algae density 228. This flow rate 220 also determines the food supply rate to the artemia. The data acquisition and control subsystem 700 also controls the return flow rate 320 of the artemia subsystem 300 to maintain an adequate supply of artemia to the aquatic specie. This flow rate 320 increases as the aquatic specie grow in size, and also determines the filtration rate of the artemia subsystem 300. The data acquisition and control subsystem 700 also controls the return flow rate 420 of the aquatic specie subsystem 400 to maintain adequate filtration of the aquatic specie subsystem 400. This flow rate 420 increases as the aquatic specie grow in size, and also affects the amount of time that the artemia stay in the aquatic specie subsystem 400. As the saltwater level 412 in the aquatic specie subsystem 400 increases, the filtration subsystem pump 620 operates at a greater flow rate because of reduced head pressure. The data acquisition and control subsystem 700 controls the filtration subsystem return flow rate 612 to maintain optimal flow rates to the other subsystems.

Figure 7:
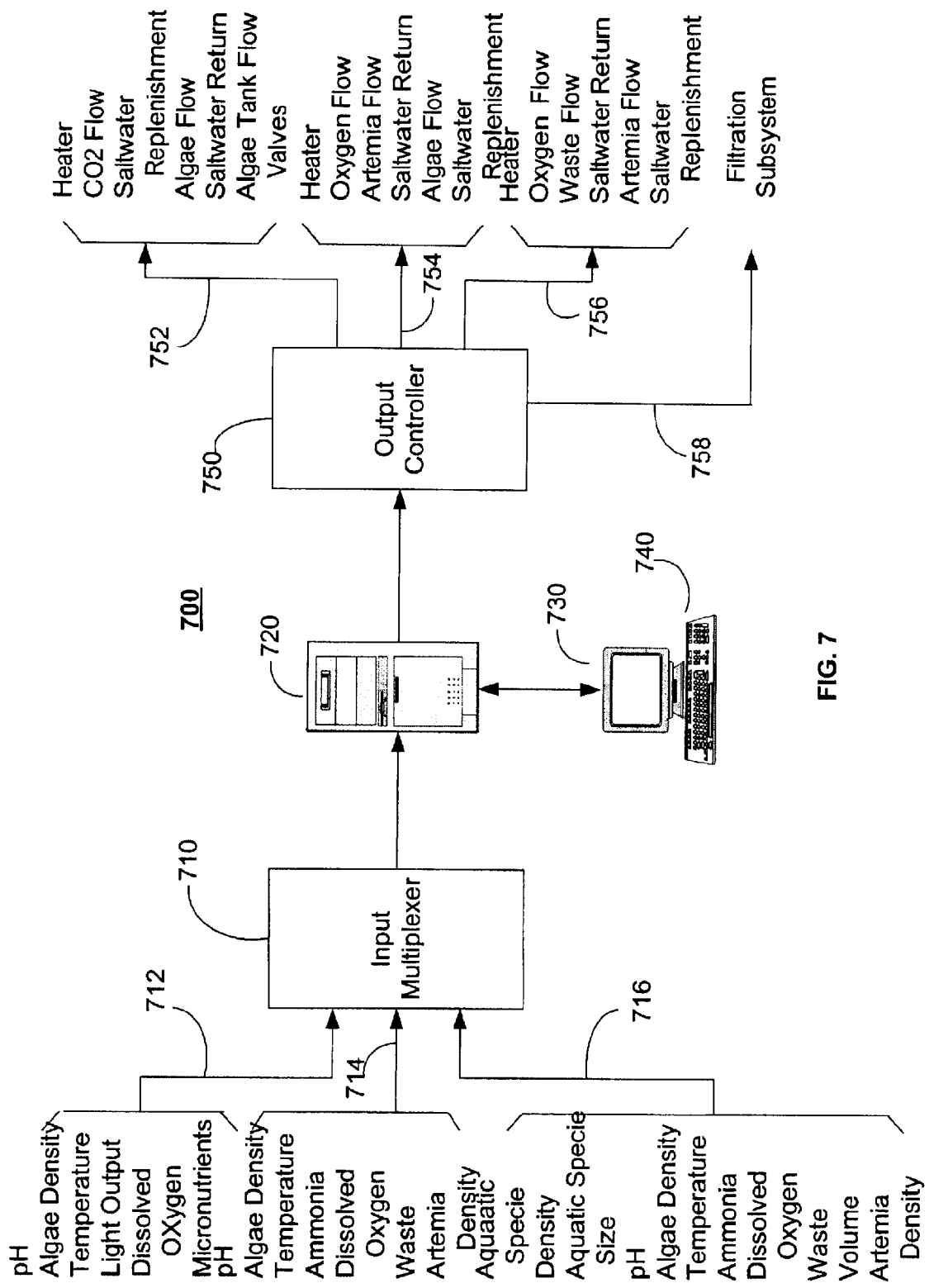
FIG. 7 shows a data acquisition and control subsystem for use in aquaculture systems.

Turning now to FIG. 7, FIG. 7 shows a data acquisition and control subsystem 700 for use in an aquaculture system 100, 800. The data acquisition and control subsystem 700 uses sensors to monitor and devices to control critical parameters of the aquaculture system 100, 800, enabling the system to sustain algae and artemia cultures while promoting rapid aquatic specie growth. A microprocessor-based system uses predetermined algorithms to maintain these critical parameters without operator intervention. The data acquisition and control subsystem 700 also records and transmits system measurements and control events to a user interface for review and analysis by an operator. The data acquisition and control subsystem 700 contains an input multiplexer 710, a microprocessor 720, an output controller 750 and a video monitor 730 and keyboard 740 for providing a user interface.

Input signals 712 from the algae subsystem 200, 900 are connected to the input multiplexer 710, where they may be sequentially selected, converted to a digital format, and sent to a microprocessor 720. The input signals 712 from the algae subsystem 200, 900 include pH 226, 926, temperature 230, 930, algae density 228, 928, light output 234, 934, micronutrients 236, 936, and dissolved oxygen 232, 932. Input signals 714 from the artemia subsystem 300, 1000 are also connected to the input multiplexer 710, where they may be sequentially selected, converted to a digital format, and sent to a microprocessor 720. The input signals 714 from the artemia subsystem 300, 1000 include pH 326, 1026, temperature 330, 1030, algae density 340, 1040, artemia density 334, 1034, waste 342, 1042, ammonia 338, 1038 and dissolved oxygen 332, 1032. Input signals 716 from the aquatic specie subsystem 400, 1100 are also connected to the input multiplexer 710 where they may be sequentially selected, converted to a digital format, and sent to a microprocessor 720. The input signals 716 from the aquatic specie subsystem 400, 1100 include pH 426, 1126, temperature 430, 1130, algae density 444, 1144, artemia density 434, 1134, aquatic specie density 440, 1141, waste 446, 1146, ammonia 438, 1138, dissolved oxygen 432, 1132, aquatic specie size 440, 1140, and volume 448, 1148.

Output signals 752 to the algae subsystem 200 900 are connected to the output controller 750 of the data acquisition and control subsystem 700, which is controlled by the microprocessor 750. For the distributed aquaculture system 800, the output signals 752 to the algae subsystem 900 include selection of one of the plurality of algae tanks. The output signals 752 to the algae subsystem 200, 900 include $CO_2$ flow control 224, 924 for controlling pH, heater control 216, 916 for controlling temperature, and saltwater return flow rate 220, 920 for controlling algae density. In the distributed aquaculture system 800, control of $CO_2$ flow 924 involves controlling valve 960, control of saltwater return rate 920 and algae flow rate 922 involves controlling valves 962, 964, and 966, and control of saltwater replenishment 908 involves control of valve 968. Output signals 754 to the artemia subsystem 300, 1000 are also connected to the output controller 750 for control by the microprocessor 750. The output signals 754 to the artemia subsystem 300, 1000 include saltwater return flow rate 320, 1020 for controlling pH, heater control 316, 1016 for controlling temperature, and oxygen flow control 344, 1044 for controlling dissolved oxygen. In the distributed aquaculture system 800, control the saltwater return flow 1020 involves controlling valve 1021, control of oxygen flow 1044 involves controlling valve 1043, control of saltwater replenishment 1008 involves controlling valve 1068, and control of algae flow 1024 involves controlling valve 1023. Note that artemia feed rate in the artemia subsystem 300 is controlled by the saltwater return flow rate 220 of the algae subsystem 200 and the artemia waste removal is controlled by saltwater return flow rate 320 of the artemia subsystem 300. Output signals 756 to the aquatic specie subsystem 400, 1100 are also connected to the output controller 750 for control by the microprocessor 720. The output signals 756 to the aquatic specie subsystem 400, 1100 include heater control 416, 1116 for controlling temperature, oxygen flow control 450, 1150 for controlling dissolved oxygen, and saltwater return flow rate 420, 1120 to the aquatic specie subsystem 400, 1100 for controlling waste removal and volume. In the distributed aquaculture system 800, control of the waste flow 1142 from the aquatic specie subsystem 1100 involves controlling valve 1143, control of saltwater return 1120 involves controlling valve 1121, control of oxygen flow 1150 involves controlling valve 1151, and control of saltwater replenishment 1108 involves controlling valve 1168. Note that the pH of the aquatic specie subsystem 400 is controlled by the saltwater return flow rate 220 of the algae subsystem 200, and the aquatic specie feed rate is controlled by varying the saltwater return flow rate 320 of the artemia subsystem 300.

Figure 8:
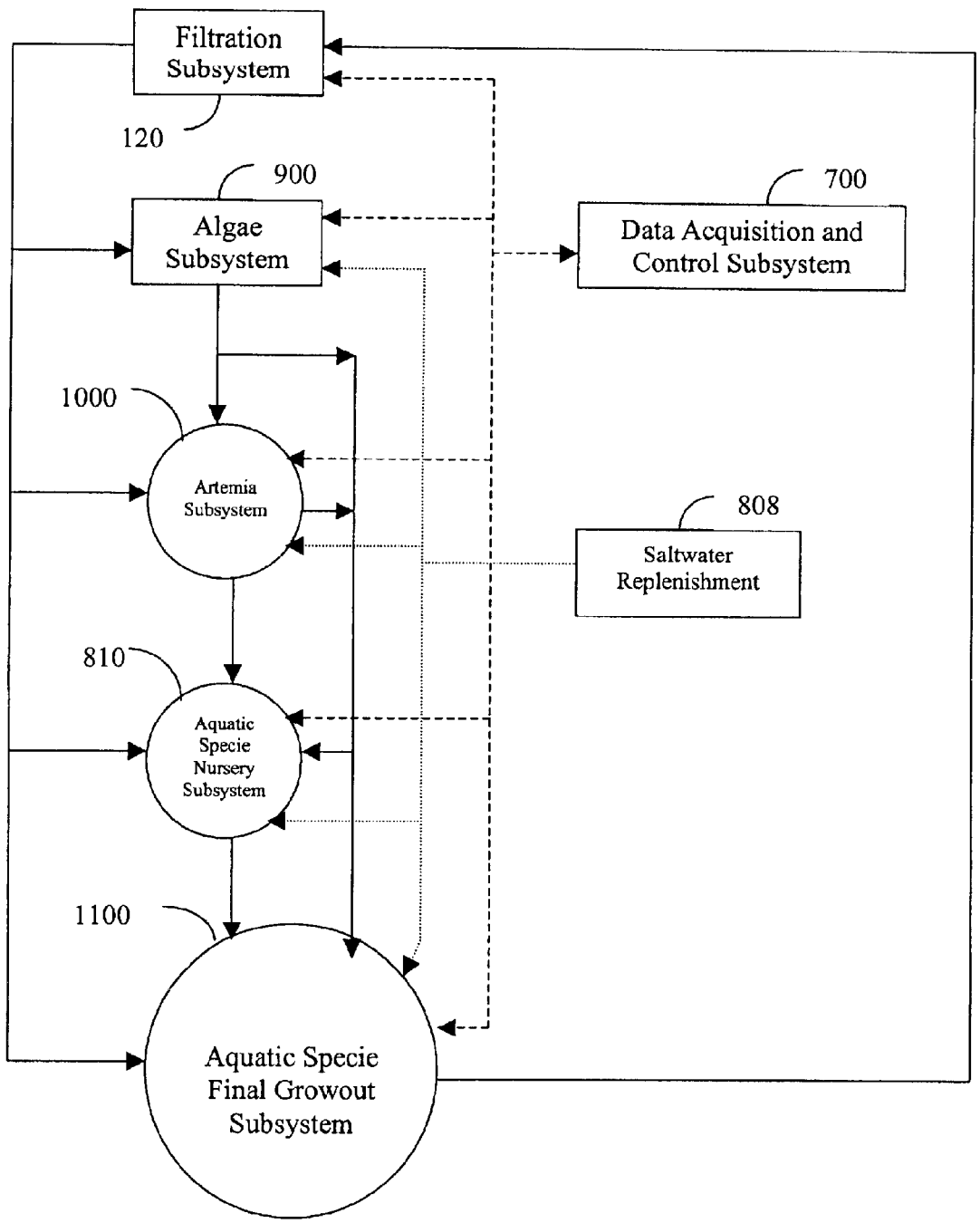
FIG. 8 shows a distributed aquaculture system according to the present invention.

Turning now to FIG. 8, FIG. 8 shows a distributed aquaculture system 800 according to the present invention using nursery tanks. The distributed aquaculture system 800 includes a filtration subsystem 1200 (see FIG. 12), one or more algae subsystems 900 (see FIG. 9), one or more artemia subsystems 1000 (see FIG. 10), one or more aquatic specie nursery subsystem 810 (see FIG. 11), one or more aquatic specie final growout subsystem 1100 (see FIG. 11), a data acquisition and control subsystem 700 (see FIG. 7), and a saltwater replenishment source 808. The flow from the one or more aquatic specie nursery subsystem 810 to the one or more aquatic specie final growout subsystem 1100 is preferably by gravity feed. The filtration subsystem 1200 is described below regarding FIG. 12, and accepts a waste stream from the aquatic specie final growout subsystem 1100 and provides a saltwater return to the algae subsystem 900, the artemia subsystem 1000, the aquatic specie nursery subsystem 810, and the aquatic specie final growout subsystem 1100. Algae are grown in the algae subsystem 900 and flows to the artemia subsystem 1000, the aquatic specie nursery subsystem 810, and the aquatic specie final growout subsystem 1100. Adult artemia in the artemia subsystem 1000 feed on the algae and produce small artemia, which flow to the aquatic specie nursery subsystem 810 and the aquatic species subsystem 1100. The aquatic specie to be produced by the system 800 is introduced into the aquatic nursery subsystem 810 at an immature stage, raised for an initial growth period, and then transferred to the aquatic specie final growout subsystem 1100 to be raised to an adult stage for harvesting. These immature species are contained in the aquatic specie nursery subsystem 810 and the aquatic specie final growout subsystem 1100 and feed on the algae and small artemia in the aquatic specie nursery subsystem 810 and the aquatic specie final growout subsystem 1100.

Although the algae reduces the affect of waste products from the artemia and aquatic specie, the system 800 utilizes a unique filtration subsystem 1200 that removes additional waste from the system during growth of the aquatic specie being produced. The data acquisition and control subsystem 700 is critical for maintaining a suitable environment for the algae, artemia, and aquatic specie being produced by automatically monitoring and regulating a number of critical environmental parameters. A source for saltwater replenishment 808 is provided to the algae subsystem 900, the artemia subsystem 1000, the aquatic specie nursery subsystem 810, and the aquatic specie final growout subsystem 1100 for replacing saltwater lost from evaporation and leakage. The system 800 may include one or more aquatic specie nursery subsystems 810. As noted above, although the method and system of the present invention may be used to produce a variety of aquatic species, the preferred embodiments disclose the production of shrimp.

Figure 9:
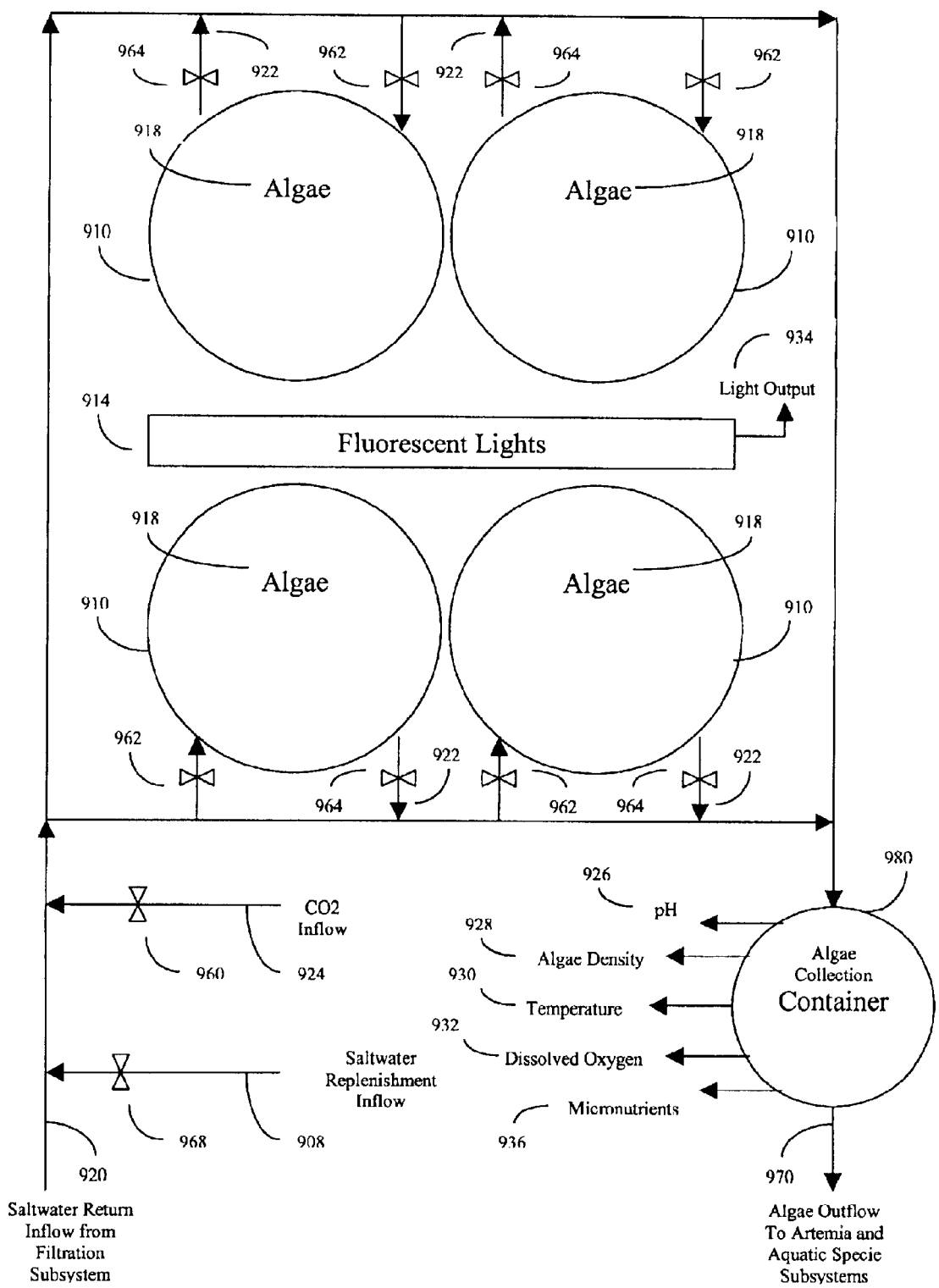
FIG. 9 shows an algae subsystem for use in a distributed aquaculture system.

Turning now to FIG. 9, FIG. 9 shows an algae subsystem 900 for use in a distributed aquaculture system 800 shown in FIG. 8. The algae subsystem 900 uses one or more sealed or open containers 910, such as bags or tanks, that contain saltwater and algae 918. The saltwater typically has a salinity of from 30 to 35 parts per thousand. Lighting 914 provides energy for proper algae growth. The light output 934 is monitored by the data acquisition and monitoring subsystem 700. Sensors within the algae collection container 980 connected to the data acquisition and monitoring subsystem 700 provide continuous monitoring of pH 926, algae density 928, temperature 930, micronutrients 936, and dissolved oxygen 932. Since algae growth naturally causes the pH of the algae subsystem 900 to increase, controlled amounts of carbon dioxide gas ($CO_2$) 924 is introduced into the system to maintain the pH within acceptable levels. The amount of $CO_2$ gas 924 introduced into the sealed or open containers 910 is determined by a control valve 960, which is controlled by the data acquisition and control subsystem 700. Each sealed container 910 may receive saltwater return 920 from the filtration subsystem 1200 through a control valve 962, which is controlled by the data acquisition and control subsystem 700. Algae flow 922 from each sealed container 910 to the artemia subsystem 1000 and aquatic specie subsystem 1100 is determined by a control valve 964, which is controlled by the data acquisition and control subsystem 700. The algae flow 922 will feed from the selected sealed or open containers 910, in the algae subsystem 900 to the algae collection container 980. The outflow from the algae collection container 970 feeds the artemia subsystem 1000 and the aquatic specie subsystem 1100. The algae outflow 970 is controlled by the data acquisition and control subsystem 700. Saltwater replenishment 908 having a typical salinity of 30 to 35 parts per thousand is provided through a control valve 968, which is controlled by the data acquisition and control subsystem 700, to replace saltwater losses, such as by evaporation and leakage. An optimal saltwater return rate 920 to each sealed container 910 will keep the algae density 928 between approximately 100 thousand to 10 million cells per milliliter for the preferred strain of algae (tajitian strain of *isochrysis galbana*).

Figure 10:
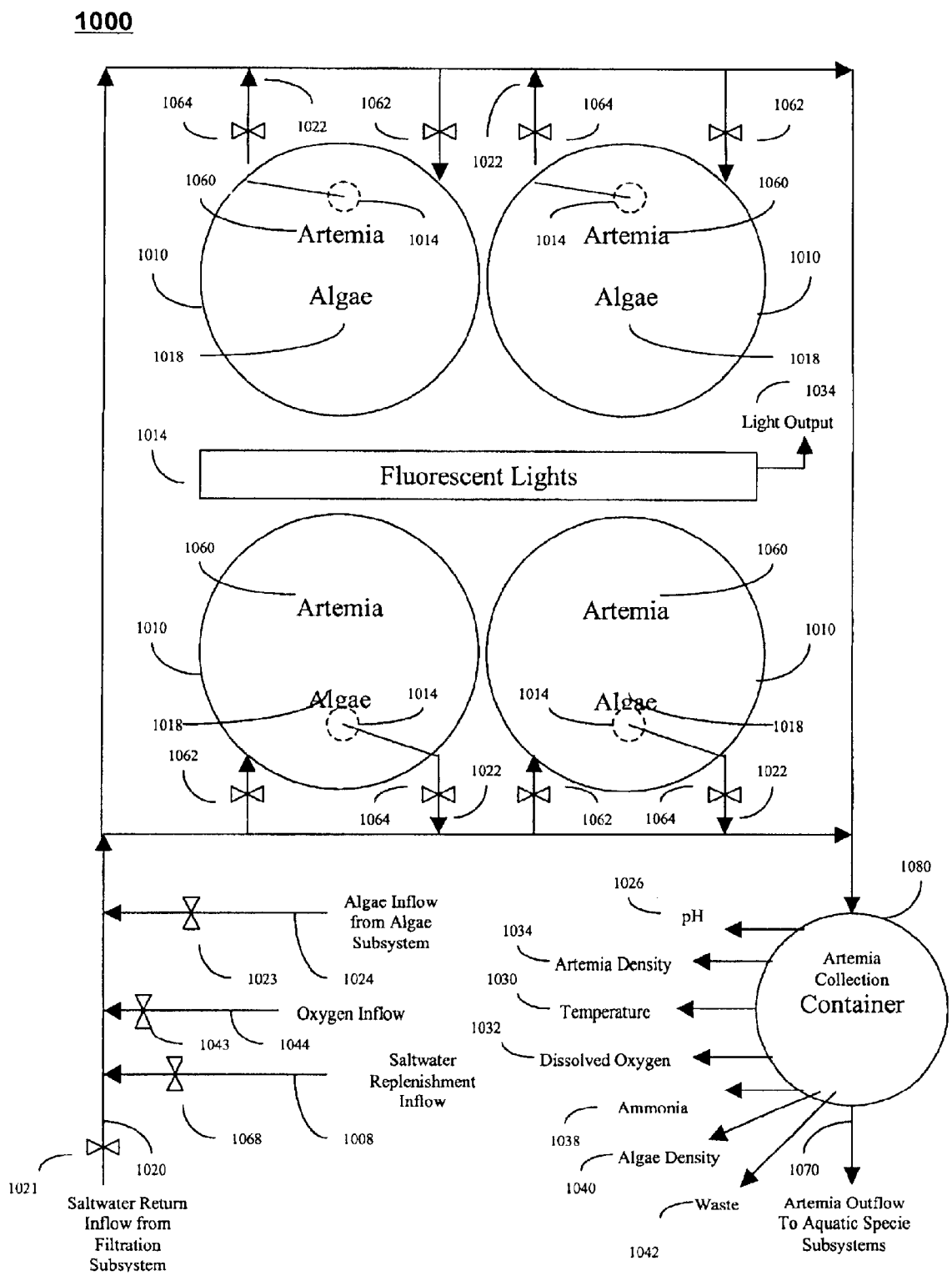
FIG. 10 shows an artemia subsystem for use in a distributed aquaculture system.

Turning now to FIG. 10, FIG. 10 shows an artemia subsystem 1000 for use in a distributed aquaculture system 800. The artemia subsystem 1000 utilizes sealed or open containers 1010, such as bags or tanks, which contains saltwater, algae 1018, and artemia 1060. Sensors within the artemia collection container 1080 continuously monitor artemia density 1034, temperature 1030, pH 1026, ammonia 1038, algae density 1040, waste 1042 and dissolved oxygen 1032. These sensors are connected to the data acquisition and control subsystem 700. Lighting 1014 provides energy for proper algae growth. The light output 1034 is also monitored by the data acquisition and monitoring subsystem 700. Although waste from the artemia 1060 causes the pH of the artemia subsystem 1000 to decrease, the presence of the algae 1018 will increase the pH, thereby stabilizing the pH of the artemia subsystem 1000. Each sealed container 1010 may receive saltwater return 1020 from the filtration subsystem 1200 through a control valve 1062. The algae 1018 also serve as food for the artemia 1060. The adult artemia 1060 produce small artemia on a continuous basis. A 400-micron screen 1014 in each container 1010 prevents the adult artemia 1060 from leaving the artemia subsystem 1000 in the flow 1022 through a control valve 1064, which is controlled by the data acquisition and monitoring subsystem 700, to the artemia collection container 1080. This allows the artemia waste and small artemia to pass from the artemia subsystem 1000 to the aquatic specie subsystem 1100 in the flow 1070. In an alternative embodiment, the 400-micron screen is removed from the artemia subsystem 1000 to allow both small artemia and adult artemia to flow from the artemia subsystem 1000 to the aquatic specie nursery subsystem 810 and the aquatic specie growout subsystem 1100. The flow rate to the aquatic specie subsystem 1022 from each sealed container 1010 will depend on the return flow rate 1020 from the filtration subsystem 600 and the flow rate 1024 from the algae subsystem 900. The algae flow 1024 from the algae subsystem 900 is controlled by a valve 1023, which is controlled by the data acquisition and control subsystem 700. The saltwater return from the filtration subsystem 1020 is controlled by a valve 1021, which is controlled by the data acquisition and control subsystem 700. An optimal flow rate 1022 to the aquatic specie subsystem from each sealed container 1010 adequately removes waste from the artemia subsystem 1000 and also provides sufficient artemia 1060 to the aquatic specie subsystem 1100 for food. A flow of oxygen 1044 in the form of air is introduced into the artemia subsystem 1000 for controlling the level of dissolved oxygen. The flow of oxygen is controlled by a valve 1043, which is controlled by the data acquisition and control subsystem 700. Saltwater replenishment 1008 to the artemia subsystem 1000 is controlled by a valve 1068, which is controlled by the data acquisition and control subsystem 700. The saltwater level in the artemia subsystem 1000 is determined by the return flow rate 1020 from the filtration subsystem 600 and the algae subsystem 1024. The preferred artemia species 1060 originate from the Great Salt Lake in Utah.

Figure 11:
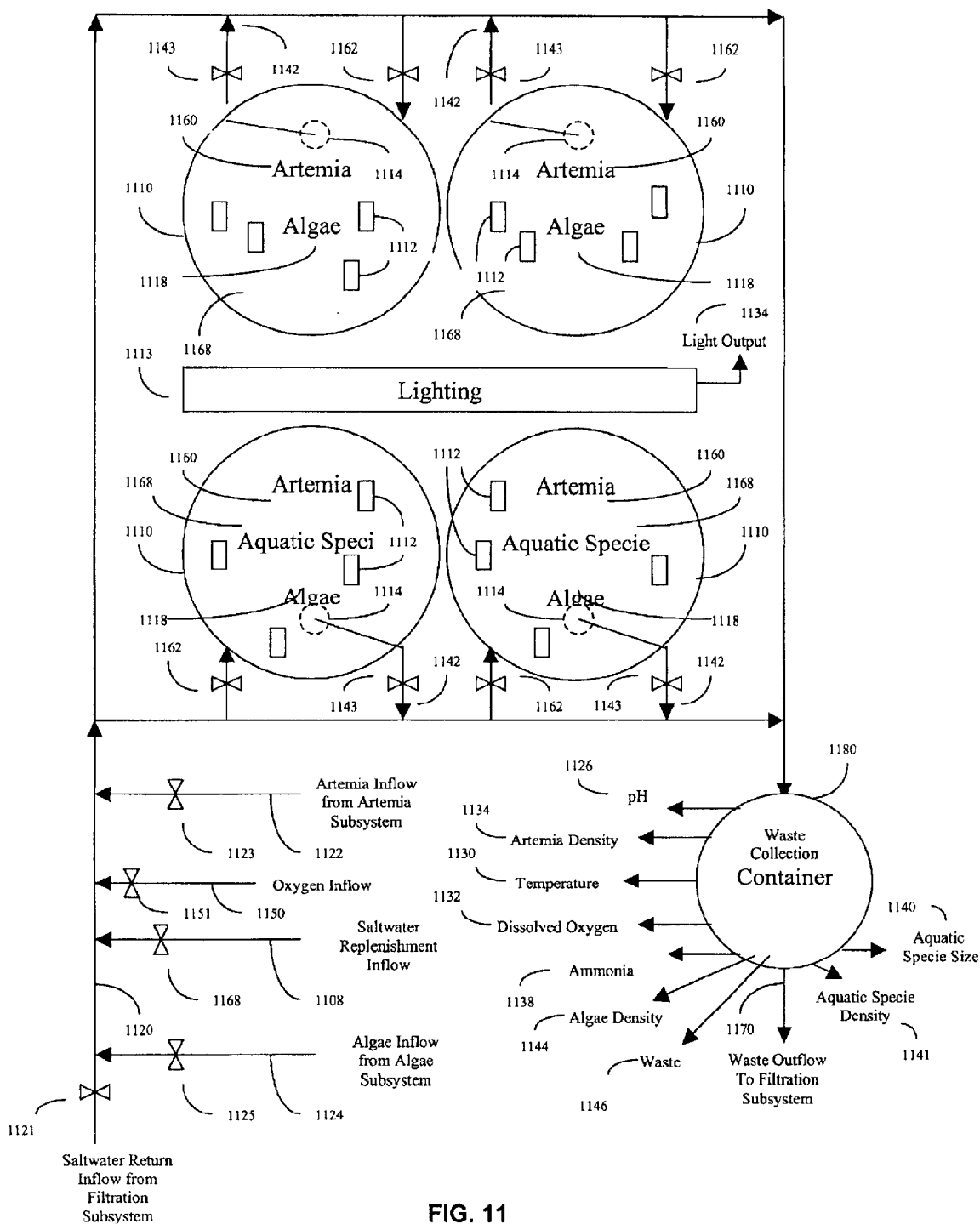
FIG. 11 shows an aquatic specie subsystem for use in a distributed aquaculture system.

Turning now to FIG. 11, FIG. 11 shows an aquatic specie subsystem 810, 1100 for use in a distributed aquaculture system 800. The configuration shown in FIG. 11 is used for both the aquatic specie nursery subsystem 810 and the aquatic specie final growout subsystem 1100 shown in FIG. 8. The aquatic specie subsystem 810, 1100 utilizes one or more sealed or open containers 1110, such as bags or tanks. Habitat structures 1112 are positioned in the aquatic species subsystem 810, 1100 for providing a greater habitat surface area for increasing the amount of aquatic species within the subsystem. The aquatic specie subsystem 810, 1100 also contains aquatic specie 1168, preferably shrimp, algae 1118, saltwater, and artemia 1160. Sensors contained within the waste collection container 1180 connected to the data acquisition and control subsystem 700 continuously monitor artemia density 1134, aquatic specie size 1140, aquatic specie density 1141, temperature 1130, pH 1126, dissolved oxygen 1132, algae density 1144, waste 1146, and ammonia 1138. Lighting 1113 provides energy for proper algae growth. The light output 1134 is monitored by the data acquisition and monitoring subsystem 700. The algae 1118 and the artemia 1160 are food for the aquatic specie 1168. A graded screen 550, preferably nylon material, provides filtration of aquatic specie waste products and allows waste flow 1170 to the filter subsystem 1200. The aquatic specie subsystem 810, 1100 is initially stocked with live, commercially available postlarvae shrimp in salt water maintained at a low level. As the shrimp grow from about 0.5 inches in length to about 5 inches in length, the system 800 automatically adds saltwater to the aquatic specie subsystem 810, 1100 to gradually increase the saltwater level and effective volume of the aquatic specie subsystem 810, 1100. As the saltwater level of the aquatic specie subsystem 810, 1100 increases and the shrimp 1168 grow in size, larger screen openings of the graded screen 550 allow passage of larger waste particles while preventing the shrimp 1168 from passing through the graded screen. The method of slowly increasing the level of the saltwater and the effective volume of the aquatic specie subsystem 810, 1100 has an additional beneficial feature. When the shrimp 1168 are small, the effective volume of the aquatic specie subsystem 810, 1100 is also small, allowing a higher and more beneficial concentration of food. As the shrimp 1168 grow larger, the increase in effective volume maintains an optimum food density and optimum shrimp separation. Waste products pass through the graded screen 550 and on to the filter subsystem 1200. Since the aquaculture system 800 is a closed system, the outflow rate 1170 to the filtration subsystem 1200 will depend on the return flow rate 1120 from the filtration subsystem 1200, the flow rate 1122 from the artemia subsystem 1000, and the flow rate 1124 from the algae subsystem 900. An algae inflow valve 1125, which is controlled by the data acquisition and control subsystem 700, controls the flow 1124 from the algae subsystem 900. An artemia inflow valve 1123, which is controlled by the data acquisition and control subsystem 700, controls the flow 1122 from the artemia subsystem 1000. A saltwater return valve 1121, which is controlled by the data acquisition and control subsystem 700, controls the flow 1120 from the filtration subsystem 1200. Waste flow valves 1143 from each of the sealed or open containers, which are controlled by the data acquisition and control subsystem 700, control the flow 1142 from each sealed container 1110 to the filtration subsystem 1200. An oxygen control valve 1151, which is controlled by the data acquisition and control subsystem 700, controls the flow of air 1150 to the aquatic specie subsystem 810, 1100. A saltwater replenishment valve 1168, which is controlled by the data acquisition and control subsystem 700, controls the flow 1108 for replenishing saltwater due to evaporation and leakage. An optimum flow rate will adequately remove waste products from the aquatic specie subsystem 810, 1100 at a density of from 0.25 to 0.5 pounds of shrimp per gallon of saltwater. The preferred shrimp species is *Litopenaeus Vannamei* (Pacific White Shrimp).

Figure 12:
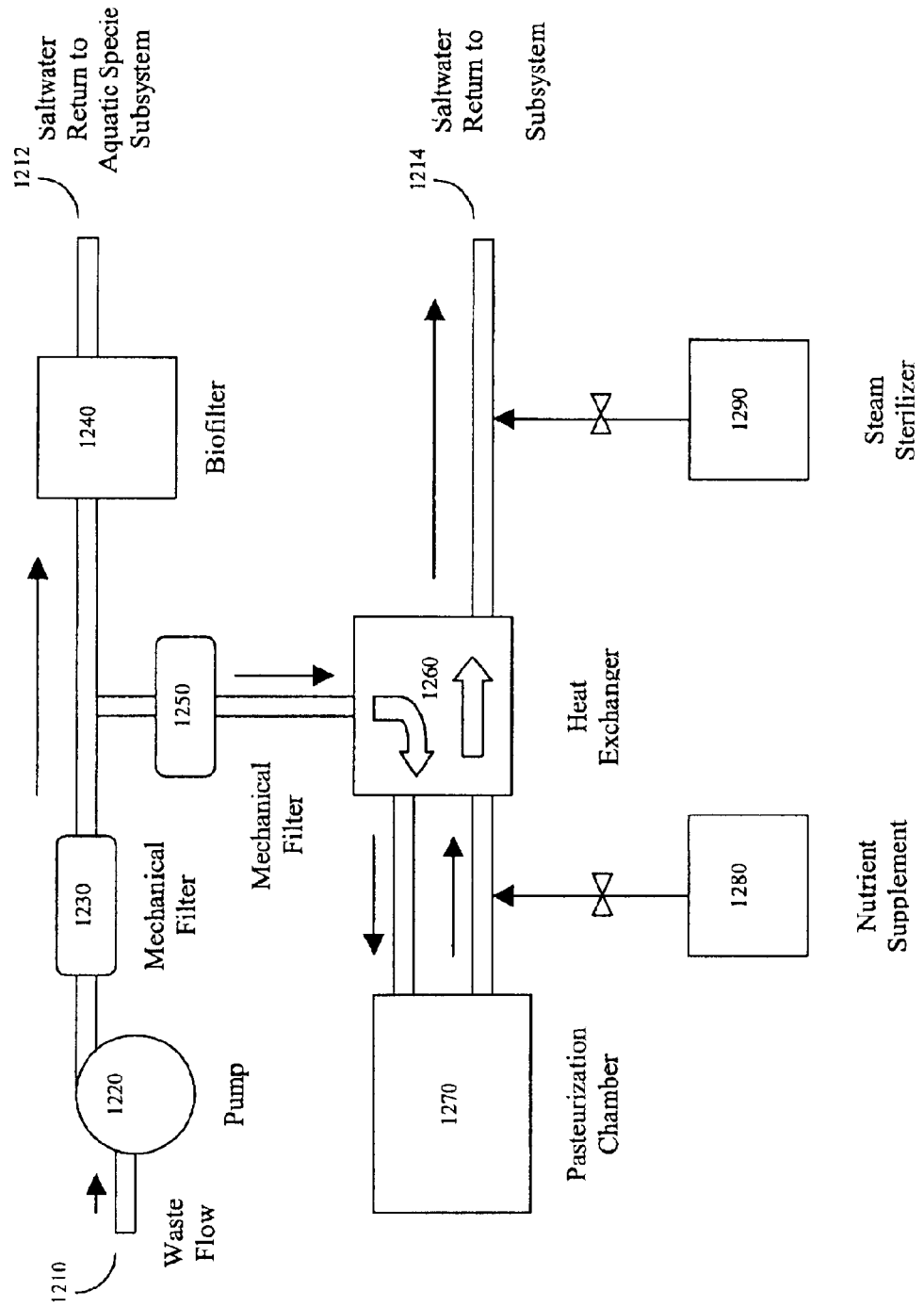
FIG. 12 shows a filtration subsystem for use in an aquaculture system.

Turning now to FIG. 12, FIG. 12 shows a filtration subsystem 1200 for use in an aquaculture system 800. The input flow 1210 from the aquatic specie final growout subsystem 1100 to the filtration subsystem 1200 is depicted in FIG. 8 and the output flow 1212 to the algae subsystem 900, the artemia subsystem 1000, the aquatic specie nursery subsystem 810 and the aquatic specie subsystem 1100 is explained with regard to FIG. 8–FIG. 11. The input flow 1210 to the filtration system 1200 is connected to the sealed container waste outflow 1142 from the aquatic specie subsystem 1100 after passing through a graded filter screen 550. The output flow 1212 from the filtration subsystem 1200 is connected to the saltwater return of the aquatic specie subsystem 1120. The output flow 1214 from the filtration subsystem 1200 is connected to the saltwater return 920 of the algae subsystem 900 and the saltwater return 1020 of the artemia subsystem 1000. As noted above, waste enters the input flow 1210 filtration subsystem 1200 from the aquatic specie subsystem 1100 after passing through the graded filter screen 550. Although the algae in the system 800 will remove micronutrients from the system created by the aquatic specie waste products, additional filtration allows for higher aquatic specie densities. A saltwater pump 1220 pumps the waste product stream 1210, which has passed through the graded filter screen 550, through a mechanical filter 1230 to remove particulate material. The mechanical filter 1230 contains various filters ranging in size from 500 microns down to a preferred filter size of about 5 microns, thereby trapping particulate material having a size greater than 5 microns. The waste stream is then divided into two paths. The first path is passed through a biofilter 1240 to convert ammonia into nitrates for use as a nutrient for the algae in the aquatic specie subsystem 1100. After filtration of the waste stream, a plumbing and valve network returns the filtered and cleansed saltwater to the aquatic specie subsystem 1100. The return flow rates to this subsystem, which is controlled by the data acquisition and control subsystem 700 and respective return valves, determines the flow rate through to the subsystem. The data acquisition and control subsystem 700 also controls the return flow rate 1120 of the aquatic specie subsystem 1100 to maintain adequate filtration of the aquatic specie subsystem 1100'. This flow rate 1120 increases as the aquatic specie grow in size, and also affects the amount of time that the artemia stay in the aquatic specie subsystem 1100. The second path within the filtration subsystem 1200 is passed through another mechanical filter 1250. The mechanical filter 1250 contains various filters ranging in size from 50 microns down to a preferred filter size of about 5 microns, thereby trapping particulate material having a size greater than 5 microns. The waste stream then passes through a heat exchanger 1260 and pasteurization chamber 1270 that first heats the waste stream to a preferred 180 degrees F. and then cools the waste stream to a preferred 80 degrees F. This method sterilizes the waste stream prior to use in the algae subsystem 900 and the artemia subsystem 1000 that destroys any living organisms that may have entered the waste stream and which might compete and contaminate the preferred algae. After filtration of the waste stream, a plumbing and valve network returns the filtered and cleansed saltwater to the algae subsystem 900, and the artemia subsystem 1000. The return flow rates to each of these subsystems, which is controlled by the data acquisition and control subsystem 700 and respective return valves, determines the flow rate through each subsystem. The data acquisition and control subsystem 700 will vary the return flow rate 920 of the algae subsystem 900 to maintain a specific range of algae density 928. This flow rate 920 also determines the food supply rate to the artemia. The data acquisition and control subsystem 700 also controls the return flow rate 1020 of the artemia subsystem 1000 to maintain an adequate supply of artemia to the aquatic specie. The flow rate 1020 increases as the aquatic specie grow in size, and also determines the filtration rate of the artemia subsystem 1000. The data acquisition and control subsystem 700 will monitor the nutrient level of the waste stream and vary the flow of supplemental nutrients 1280 to the waste stream, if necessary, after it leaves the pasteurization chamber 1270. Also, periodically, a steam sterilizer 1290 will steam sterilize the plumbing from the heat exchanger 1260 to the algae subsystem 900 and the artemia subsystem 1000 to destroy any living organisms that might develop within the plumbing after pasteurization.

Although the present invention has been described in detail with reference to certain preferred embodiments, it should be apparent that modifications and adaptations to those embodiments might occur to persons skilled in the art without departing from the spirit and scope of the present invention.

What is claimed is:

1. A method for producing adult aquatic specie in an aquaculture system comprising:
    growing algae within an algae subsystem containing saltwater illuminated by a light source;
    flowing the algae from the algae subsystem into an artemia subsystem containing adult artemia, an aquatic specie nursery subsystem and an aquatic specie growout subsystem, all containing saltwater;
    consuming the algae by the adult artemia and producing small artemia by the adult artemia within the artemia subsystem;
    passing the small artemia from the artemia subsystem to the aquatic specie nursery subsystem and the aquatic specie growout subsystem;
    consuming the algae and the small artemia by immature aquatic specie contained within the aquatic specie nursery subsystem for producing adolescent aquatic specie, the adolescent aquatic specie being passed to the aquatic specie growout subsystem;
    consuming the algae and the small artemia by the adolescent aquatic specie contained within the aquatic specie growout subsystem for producing adult aquatic specie; and
    harvesting the adult aquatic specie.

2. The method of claim 1, further comprising filtering a waste outflow from the aquatic specie growout subsystem by a filtration subsystem for providing a saltwater return to the algae subsystem, the artemia subsystem, the aquatic specie nursery subsystem and the aquatic specie growout subsystem.

3. The method of claim 2, wherein the step of filtering a waste outflow from the aquatic specie growout subsystem comprises:
    pumping the waste outflow from the aquatic specie growout subsystem to an input of a first mechanical filter;
    flowing a first part of an outflow from the first mechanical filter to an inflow of a biofilter, an outflow of the biofilter being connected to a saltwater return inflow of the aquatic specie nursery subsystem and a saltwater return inflow of the aquatic specie growout subsystem;
    flowing a second part of the outflow from the first mechanical filter to an inflow of a second mechanical filter, an outflow of the second mechanical filter being flowed through an inflow heating passage of a heat exchanger to a pasteurization chamber inflow;
    pasteurizing the pasteurization chamber inflow from the heat exchanger for destroying living organisms in the inflow and flowing a pasteurization chamber outflow to an outflow cooling passage of the heat exchanger; and
    flowing a pasteurized and cooled outflow from the heat exchanger outflow cooling passage to a saltwater return inflow of the algae subsystem and a saltwater return inflow of the artemia subsystem.

4. The method of claim 3, further comprising adding supplemental nutrients to the pasteurization chamber outflow under control of a data acquisition and control subsystem.

5. The method of claim 3, further comprising sterilizing the flow conduits from the heat exchanger cooling passage to the saltwater return inflow of the algae subsystem and the saltwater return inflow of the artemia subsystem using a steam sterilizer under control of a data acquisition and control subsystem.

6. The method of claim 1, further comprising controlling the aquaculture system with a data acquisition and control subsystem.

7. The method of claim 6, wherein the step of controlling the aquaculture system comprises:
    connecting measurements from the algae subsystem, artemia subsystem, the aquatic specie nursery subsystem and the aquatic specie growout subsystem to an input multiplexer;
    connecting an output from the input multiplexer to an input of a microprocessor;
    connecting an output of the microprocessor to a controller output;
    connecting an output from the output controller to controls for the algae subsystem, the artemia subsystem, the aquatic specie nursery subsystem, the aquatic specie growout subsystem and the filtration subsystem; and
    connecting the microprocessor to a video monitor and keyboard for providing a user interface.

8. The method of claim 1, further comprising replenishing saltwater lost in the aquaculture system due to evaporation and leakage.

9. The method of claim 1, wherein the step of growing algae within an algae subsystem further comprises:
    seeding a selected strain of algae into one or more containers containing saltwater;
    illuminating the algae subsystem with a light source for proper algae growth;
    maintaining a temperature of the algae and saltwater by a heater means;
    measuring pH, algae density, temperature, light source output, dissolved oxygen and micronutrients; and
    controlling $CO_2$ inflow for pH control, saltwater replenishment inflow, light source output, saltwater return inflow from a filtration subsystem, and algae outflow to the artemia subsystem, the aquatic specie nursery subsystem and the aquatic specie growout subsystem.

10. The method of claim 9, wherein the selected strain of algae is selected from the group consisting of *isochrysis galbana, nannochloropsis, dunaliella, skeletonema, thalassiosira, phaeodactylum, chaetoceros, cylindrotheca, tetraselmis,* and *spirulina*.

11. The method of claim 9, wherein the optimum saltwater return inflow value is selected to maintain an algae density value within a range of from 100 thousand to 10 million cells per milliliter of the preferred strain of algae.

12. The method of claim 9, wherein the one or more containers is selected from the group consisting of open containers and sealed containers.

13. The method claim 1, wherein the step of consuming algae by the adult artemia and producing small artemia by the adult artemia within the artemia subsystem further comprises:
    adding adult artemia to one or more containers containing saltwater;

illuminating the artemia subsystem with a light source for proper algae growth;

maintaining a temperature of the artemia, algae and saltwater by a heater means;

measuring waste, algae density, artemia density, temperature, pH, ammonia, light source output and dissolved oxygen; and controlling oxygen inflow, saltwater return inflow from a filtration subsystem, light source output, saltwater replenishment inflow, algae inflow and artemia outflow to the aquatic specie subsystem.

14. The method of claim 13, wherein controlling a saltwater return inflow value maintains an artemia outflow value to the aquatic specie nursery subsystem and the aquatic specie growout subsystem to adequately remove waste from the artemia subsystem and provide sufficient artemia to the aquatic specie nursery subsystem and the aquatic specie growout subsystem for food.

15. The method of claim 13, further comprising preventing adult artemia from leaving the one or more containers of the artemia subsystem and allowing artemia waste and small artemia to pass from the one or more containers of the artemia subsystem to the aquatic specie nursery subsystem and the aquatic specie growout subsystem by filtering container outflow through a 400 micron screen.

16. The method of claim 13, wherein the one or more containers is selected from the group consisting of open containers and sealed containers.

17. The method of claim 1, wherein the step of consuming the algae and the small artemia by an immature aquatic specie contained within the aquatic specie nursery subsystem further comprises:

placing the immature aquatic specie in one or more containers in the aquatic specie nursery subsystem for consuming algae and artemia for producing adolescent aquatic specie;

illuminating the aquatic specie nursery subsystem with a light source for proper algae growth;

maintaining a temperature of the immature aquatic specie, algae, artemia and saltwater by a heater means;

measuring waste, algae density, artemia density, aquatic specie size, aquatic specie density, temperature, pH, ammonia, light source output, and dissolved oxygen;

controlling oxygen inflow, saltwater return inflow from a filtration subsystem, light source output, saltwater replenishment inflow, artemia inflow from the artemia subsystem, algae inflow from the algae subsystem and waste outflow to the filtration subsystem;

gradually increasing the saltwater level in the one or more containers for increasing a volume of the one or more containers as the immature aquatic specie increase from immature size to adolescent size; and enabling the adolescent aquatic specie to be passed through to the aquatic specie growout system.

18. The method of claim 17, wherein the step of controlling the waste outflow to the filtration subsystem comprises filtering the waste outflow from the aquatic specie nursery subsystem through a filter screen to prevent immature aquatic specie from leaving the aquatic specie nursery subsystem and allowing waste products to pass to the filtration subsystem.

19. The method of claim 18, wherein the filter screen comprises a 400 micron bottom section and a 800 micron top section for enabling disposal of increased waste products from increasing size aquatic specie as the effective volume of the aquatic subsystem is increased by adding increasing a saltwater level to accommodate the larger specie size.

20. The method of claim 17, wherein controlling a saltwater return inflow value maintains a waste outflow value to the filtration subsystem by controlling volume to adequately remove waste from the aquatic specie subsystem.

21. The method of claim 17, wherein the preferred aquatic specie is selected from the group consisting of *litopenaeus vannamei, monodon, indicus, stylirostis, chinensis, japonicus*, and *merguiensis*.

22. The method of claim 17, wherein the optimum waste outflow rate from the aquatic specie nursery subsystem is selected to remove waste products from an aquatic specie density of from 0.25 to 0.5 pounds per gallon of saltwater.

23. The method of claim 17, wherein the one or more containers is selected from the group consisting of open containers and sealed containers.

24. The method of claim 1, wherein the step of consuming the algae and the small artemia by the adolescent aquatic specie contained within the aquatic specie growout subsystem further comprises:

containing the immature aquatic specie in one or more containers in the aquatic specie growout subsystem for consuming algae and artemia;

illuminating the aquatic specie growout subsystem with a light source for proper algae growth;

maintaining a temperature of the adolescent aquatic specie, algae, artemia and saltwater by a heater means;

measuring waste, algae density, artemia density, aquatic specie size, aquatic specie density, temperature, pH, ammonia, light source output, and dissolved oxygen;

controlling oxygen inflow, light source output, saltwater return inflow from a filtration subsystem, saltwater replenishment inflow, artemia inflow from the artemia subsystem, algae inflow from the algae subsystem and waste outflow to the filtration subsystem; and gradually increasing the saltwater level in the one or more containers for increasing a volume of the one or more containers as the adolescent aquatic specie increase from adolescent size to adult size.

25. The method of claim 24, wherein the step of controlling the waste outflow to the filtration subsystem comprises filtering the waste outflow from the aquatic specie growout subsystem through a filter screen to prevent immature aquatic specie from leaving the aquatic specie growout subsystem and allowing waste products to pass to the filtration subsystem.

26. The method of claim 24, wherein the filter screen comprises a 2000 micron bottom section and a 5000 micron top section for enabling disposal of increased waste products from increasing size aquatic specie as the effective volume of the aquatic subsystem is increased by adding increasing a saltwater level to accommodate the larger specie size.

27. The method of claim 24, wherein controlling a saltwater return inflow value maintains a waste outflow value to the filtration subsystem by controlling volume to adequately remove waste from the aquatic specie growout subsystem.

28. The method of claim 24, wherein the optimum waste outflow rate from the aquatic specie growout subsystem is selected to remove waste products from an aquatic specie density of from 0.25 to 0.5 pounds per gallon of saltwater.

29. The method of claim 24, wherein the one or more containers is selected from the group consisting of open containers and sealed containers.

30. The method of claim 1, wherein the aquaculture system comprises a closed recirculating system.

31. The method of claim 1, wherein the harvested adult aquatic specie is shrimp.

32. The method of claim 1, further comprising positioning habitat structures within the aquatic specie nursery subsystem and the aquatic specie growout subsystem for increasing the number of aquatic specie in the subsystem by providing a greater habitat surface area.

33. The method of claim 1, further comprising:
   maintaining a temperature value in the algae subsystem, the artemia subsystem, the aquatic specie nursery subsystem and the aquatic specie growout subsystem within a range of from 23° C. to 32° C.;
   maintaining a salinity value in the algae subsystem, the artemia subsystem, the aquatic specie nursery subsystem and the aquatic specie growout subsystem within a range of from 20 to 45 parts per thousand;
   maintaining a dissolved oxygen value in the artemia subsystem, the aquatic specie nursery subsystem and the aquatic specie growout subsystem within a range of from 4.5 to 9.0 parts per million;
   maintaining a pH value in the algae subsystem, the artemia subsystem, the aquatic specie nursery subsystem and the aquatic specie growout subsystem within a range of from 7.5 to 8.5; and
   adjusting an illumination level of light sources for the algae subsystem, the artemia subsystem, the aquatic specie nursery subsystem and the aquatic specie growout subsystem for regulating algae growth rates.

34. The method of claim 1, wherein the step of passing the small artemia further comprises passing the small artemia and adult artemia from the artemia subsystem to the aquatic specie nursery subsystem and the aquatic specie growout subsystem.

35. A method for producing adult aquatic specie in an aquaculture system, comprising:
   growing algae in saltwater;
   feeding the algae to adult artemia in saltwater;
   producing small artemia by the adult artemia in saltwater;
   feeding the algae and the small artemia to an immature aquatic specie in saltwater to produce adolescent aquatic specie in an aquatic specie nursery subsystem;
   passing the adolescent aquatic specie to an aquatic specie growout subsystem;
   feeding the algae and the small artemia to the adolescent aquatic specie in saltwater to produce adult aquatic specie in the aquatic specie growout subsystem; and
   harvesting the adult aquatic specie from the saltwater when mature.

36. The method of claim 35, wherein the step of growing algae comprises:
   illuminating the algae in the saltwater by a light source;
   controlling a temperature of the algae in the saltwater by a heat source;
   regulating a CO2 inflow to control pH of the saltwater;
   replenishing saltwater lost due to evaporation and leakage;
   regulating a saltwater return inflow for controlling algae outflow; and
   measuring pH, algae density, temperature, light source output, dissolved oxygen and micronutrients.

37. The method of claim 35, wherein the step of feeding the algae to adult artemia in saltwater comprises:
   providing an inflow of algae and saltwater into the adult artemia in saltwater;
   illuminating the algae in the saltwater by a light source;
   controlling a temperature of the algae and adult artemia in saltwater by a heat source;
   regulating a CO2 inflow to control pH of the saltwater;
   regulating an oxygen inflow to control dissolved oxygen;
   regulating a saltwater return inflow for controlling adult artemia, algae, waste and saltwater outflow; and
   measuring pH, algae density, temperature, light source output, ammonia, dissolved oxygen, waste, and adult artemia density.

38. The method of claim 35, wherein the step of producing small artemia by the adult artemia in saltwater comprises:
   consuming algae by the adult artemia to generate small artemia;
   filtering the algae, adult artemia, small artemia, waste and saltwater through a screen that allows the algae, small artemia, waste and saltwater to pass as an outflow while restraining the adult artemia.

39. The method of claim 35, wherein the steps of feeding the algae and the small artemia to an immature aquatic specie and the adolescent aquatic specie in saltwater to produce adult aquatic specie comprises:
   providing an inflow of algae, artemia, waste and saltwater to the immature aquatic specie in saltwater;
   illuminating the algae in the saltwater by a light source;
   controlling a temperature of the algae, artemia, waste and saltwater by a heat source;
   regulating a CO2 inflow to control pH of the saltwater;
   regulating an oxygen inflow to control dissolved oxygen;
   regulating a saltwater return inflow for controlling artemia, algae, waste and saltwater outflow;
   measuring aquatic specie density, aquatic specie size, pH, algae density, temperature, light source output, ammonia, dissolved oxygen, waste, volume and artemia density;
   consuming artemia by the immature aquatic specie to produce adolescent aquatic specie;
   consuming artemia by the adolescent aquatic specie to produce adult aquatic specie; and
   filtering the algae, aquatic specie, artemia, waste and saltwater through a graded screen that allows the algae, small artemia, waste and saltwater to pass as an outflow to a filtration means while restraining the aquatic specie.

40. The method of claim 35, further comprising positioning habitat structures for increasing the number of aquatic specie in the subsystem.

41. An aquaculture system for producing adult aquatic specie, comprising:
   an algae subsystem containing saltwater illuminated by a light source for growing algae;
   means for flowing the algae from the algae subsystem into an artemia subsystem, an aquatic specie nursery subsystem and an aquatic specie growout subsystem, both containing saltwater;
   the artemia subsystem containing adult artemia for consuming the algae and producing small artemia;
   means for passing the small artemia from the artemia subsystem to the aquatic specie nursery subsystem containing an immature aquatic specie for consuming the algae and the small artemia and producing an adolescent aquatic specie;

means for passing the adolescent aquatic specie from the aquatic specie nursery subsystem to the aquatic specie growout subsystem for consuming the algae and the small artemia and producing an adult aquatic specie; and means for harvesting the adult aquatic specie.

42. The system of claim 41, further comprising a filtration subsystem for filtering a waste outflow from the aquatic specie growout subsystem and for providing a saltwater return to the algae subsystem, the artemia subsystem, the aquatic specie nursery subsystem and the aquatic specie growout subsystem.

43. The system of claim 42, wherein the filtration subsystem comprises:

a waste inflow from the aquatic specie growout subsystem connected to an inlet of a pump;

an outlet of the pump connected to an inflow of a first mechanical filter;

an outflow of the first mechanical filter connected to an inflow of a biofilter and an inflow of a second mechanical filter;

an outflow of the biofilter connected to saltwater return inflows of the aquatic specie nursery subsystem and the aquatic specie growout subsystem;

an outflow of the second mechanical filter connected through an inflow heating passage of a heat exchanger to a pasteurization chamber inflow;

the pasteurization chamber pasteurizing the pasteurization chamber inflow from the heat exchanger for destroying living organisms in the inflow, an outflow from the pasteurization chamber connected through an outflow cooling passage of the heat exchanger; and the pasteurized and cooled outflow from the heat exchanger outflow cooling passage being sent to a saltwater return inflow of the algae subsystem and a saltwater return inflow of the artemia subsystem.

44. The system of claim 41, further comprising a data acquisition and control subsystem for controlling the aquaculture system.

45. The system of claim 44, wherein the data acquisition and control subsystem for controlling the aquaculture system comprises:

an input multiplexer for accepting measurement inputs from the algae subsystem, the artemia subsystem, the aquatic specie nursery subsystem and the aquatic specie growout subsystem;

a microprocessor connected to an output of the input multiplexer, a monitor and keyboard user interface, and an input to an output controller; and control outputs of the output controller connected to the algae subsystem, the artemia subsystem, the aquatic specie nursery subsystem, the aquatic specie growout subsystem, and the filtration subsystem.

46. The system of claim 45, wherein the measurement inputs comprise:

pH, algae density, temperature, light source output, dissolved oxygen and micronutrients from the algae subsystem;

pH, algae density, temperature, light source output, ammonia, dissolved oxygen, waste, and artemia density from the artemia subsystem;

aquatic specie density, aquatic specie size, pH, algae density, temperature, ammonia, dissolved oxygen, waste, volume, and artemia density from the aquatic specie nursery subsystem; and aquatic specie density, aquatic specie size, pH, algae density, temperature, ammonia, dissolved oxygen, waste, volume, and artemia density from the aquatic specie growout subsystem.

47. The system of claim 45, wherein the control outputs comprise:

heater control, $CO_2$ inflow, saltwater replenishment inflow, light source control, algae outflow, saltwater return inflow, and algae tank flow valves to the algae subsystem;

heater control, oxygen inflow, artemia outflow, light source control, saltwater return inflow, algae inflow, and saltwater replenishment inflow to the artemia subsystem;

heater control, oxygen inflow, waste outflow, light source control, saltwater return inflow, artemia inflow, and saltwater return inflow to the aquatic specie nursery subsystem;

heater control, oxygen inflow, waste outflow, light source control, saltwater return inflow, artemia inflow, and saltwater return inflow to the aquatic specie growout subsystem; and pump speed control to the filtration subsystem.

48. The system of claim 41, further comprising means for replenishing saltwater lost in the aquaculture system due to evaporation and leakage.

49. The system of claim 41, wherein the algae subsystem containing saltwater illuminated by a light source for growing algae further comprises:

a light source for illuminating the algae in the saltwater;

a heater for controlling a temperature of the algae subsystem;

a $CO_2$ inflow for controlling pH of the algae subsystem;

a saltwater replenishment inflow for replacing saltwater lost to evaporation and leakage;

a saltwater return inflow from a filtration subsystem;

an algae outflow to the artemia subsystem; and measurement means for measuring pH, algae density, temperature, light source output, dissolved oxygen, and micronutrients of the algae subsystem.

50. The system of claim 41, wherein the artemia subsystem containing adult artemia for consuming the algae and producing small artemia further comprises:

a light source for illuminating the algae in the saltwater;

a heater for controlling temperature of the artemia subsystem;

a $CO_2$ inflow for controlling pH of the algae subsystem;

an oxygen inflow for controlling dissolved oxygen of the artemia subsystem;

a saltwater replenishment inflow for replacing saltwater lost to evaporation and leakage;

a saltwater return inflow from a filtration subsystem;

a filter screen for separating the small artemia and waste from the adult artemia;

an artemia outflow to the aquatic specie nursery subsystem; and measurement means for measuring pH, algae density, temperature, light source output, ammonia, dissolved oxygen, waste, and artemia density of the algae subsystem.

51. The system of claim 41, wherein the aquatic specie nursery subsystem containing an immature aquatic specie for consuming the algae and the small artemia and producing an adolescent aquatic specie further comprises:

a light source for illuminating the algae in the saltwater;

a heater for controlling temperature of the aquatic specie nursery subsystem;

a $CO_2$ inflow for controlling pH of the aquatic specie nursery subsystem;

an oxygen inflow for controlling dissolved oxygen of the aquatic specie nursery subsystem;

a saltwater replenishment inflow for replacing saltwater lost to evaporation and leakage;

a saltwater return inflow from a filtration subsystem;

a graded filter screen for separating the immature aquatic specie from the waste algae and small artemia;

a waste outflow to the filtration subsystem; and measurement means for measuring aquatic specie density, aquatic specie size, pH, algae density, light source output, temperature, ammonia, dissolved oxygen, waste, and volume of the algae subsystem.

52. The system of claim 51, wherein the graded filter screen is selected from the group consisting of a planar filter screen and a cylindrical filter screen.

53. The system of claim 41, wherein the aquatic specie growout subsystem containing an adolescent aquatic specie for consuming the algae and the small artemia and producing an adult aquatic specie further comprises:

a light source for illuminating the algae in the saltwater;

a heater for controlling temperature of the aquatic specie growout subsystem;

a $CO_2$ inflow for controlling pH of the aquatic specie growout subsystem;

an oxygen inflow for controlling dissolved oxygen of the aquatic specie growout subsystem;

a saltwater replenishment inflow for replacing saltwater lost to evaporation and leakage;

a saltwater return inflow from a filtration subsystem;

a graded filter screen for separating the adolescent and adult aquatic specie from the waste algae and small artemia;

a waste outflow to the filtration subsystem; and measurement means for measuring aquatic specie density, aquatic specie size, pH, algae density, light source output, temperature, ammonia, dissolved oxygen, waste, and volume of the algae subsystem.

54. The system of claim 53, wherein the graded filter screen is selected from the group consisting of a planar filter screen and a cylindrical filter screen.

55. The system of claim 41, further comprising habitat structures positioned within the aquatic specie subsystem for harvesting increased adult aquatic specie.

* * * * *